(12) United States Patent
Kim

(10) Patent No.: US 12,519,762 B2
(45) Date of Patent: Jan. 6, 2026

(54) SYSTEM FOR CONTROLLING CONTROLLER-BASED NETWORK CONNECTION AND METHOD THEREFOR

(71) Applicant: PRIBIT Technology, Inc., Seoul (KR)

(72) Inventor: Young Rang Kim, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 247 days.

(21) Appl. No.: 18/558,038

(22) PCT Filed: Apr. 27, 2022

(86) PCT No.: PCT/KR2022/006029
§ 371 (c)(1),
(2) Date: Oct. 30, 2023

(87) PCT Pub. No.: WO2022/231306
PCT Pub. Date: Nov. 3, 2022

(65) Prior Publication Data
US 2024/0223545 A1    Jul. 4, 2024

(30) Foreign Application Priority Data

Apr. 28, 2021   (KR) .................. 10-2021-0055212

(51) Int. Cl.
*H04L 9/40* (2022.01)
*H04L 43/00* (2022.01)
*H04L 43/20* (2022.01)

(52) U.S. Cl.
CPC ............ *H04L 63/0485* (2013.01); *H04L 9/40* (2022.05); *H04L 43/00* (2013.01); *H04L 43/20* (2022.05);
(Continued)

(58) Field of Classification Search
CPC ............ H04L 63/0485; H04L 63/1416; H04L 63/0428; H04L 43/00; H04L 43/20
See application file for complete search history.

(56) References Cited

U.S. PATENT DOCUMENTS

2003/0067914 A1    4/2003 Kim
2005/0240677 A1    10/2005 Liu et al.
(Continued)

FOREIGN PATENT DOCUMENTS

KR      20030027517 A    4/2003
KR    1020070014139 A    1/2007
(Continued)

OTHER PUBLICATIONS

International Search Report and Written Opinion mailed Jul. 8, 2022 for international patent appl. No. PCT/KR2022/006029.

*Primary Examiner* — Barbara B Anyan
(74) *Attorney, Agent, or Firm* — Seed Intellectual Property Law Group LLP

(57) ABSTRACT

A node according to an embodiment disclosed in the present specification includes a communication circuit, a processor operatively connected to the communication circuit, and a memory operatively connected to the processor and that stores a target application and a access control application, and the memory stores instructions that when executed by the processor, cause the node to detect an event of a network access with respect to a destination network of the target application through the access control application, to determine whether a data flow and a tunnel, which correspond to identification information of the target application and the destination network and are authorized from an external server exist through the access control application, to determine whether an inspection of a data packet of the target application is necessary based on data packet inspection information included in the authorized data flow when the authorized data flow and the authorized tunnel exist, to inspect the data packet based on a rule database included in the data packet inspection information when the inspection of the data packet is necessary, and to forward the data packet based on the authorized data flow and the authorized (Continued)

tunnel when the inspection of the data packet is not necessary or when a result of the inspection of the data packet is successful.

20 Claims, 16 Drawing Sheets

(52) U.S. Cl.
CPC ...... *H04L 63/0428* (2013.01); *H04L 63/1416* (2013.01); *H04L 63/306* (2013.01)

(56) References Cited

U.S. PATENT DOCUMENTS

| | | | | |
|---|---|---|---|---|
| 2012/0082161 | A1* | 4/2012 | Leung | H04W 48/16 370/392 |
| 2012/0224578 | A1* | 9/2012 | Mih | H04L 12/4633 370/392 |
| 2012/0246325 | A1* | 9/2012 | Pancorbo Marcos | H04L 43/00 709/227 |
| 2014/0094159 | A1* | 4/2014 | Raleigh | H04W 24/02 455/418 |
| 2015/0271102 | A1* | 9/2015 | Antich | H04L 47/805 370/230 |
| 2020/0162959 | A1* | 5/2020 | Radlein | H04L 43/20 |
| 2022/0247720 | A1 | 8/2022 | Kim | |
| 2022/0255906 | A1* | 8/2022 | Kim | H04L 63/0428 |
| 2022/0337604 | A1* | 10/2022 | Kim | H04L 63/1416 |

FOREIGN PATENT DOCUMENTS

| | | |
|---|---|---|
| KR | 1020080083511 A | 9/2008 |
| KR | 1020210045917 A | 4/2021 |
| KR | 102364445 B1 | 2/2022 |

* cited by examiner

SYSTEM FOR CONTROLLING CONTROLLER-BASED NETWORK CONNECTION AND METHOD THEREFOR

CROSS CITATION WITH RELATED APPLICATIONS

The present disclosure claims the benefit of priority based on Korean Patent Application No. 10-2021-0055212 filed on Apr. 28, 2021, and includes all contents disclosed in the literature of the Korean patent application as part of this specification.

TECHNICAL FIELD

Embodiments disclosed herein relate to a system for controlling a controller-based network access and a method therefor.

BACKGROUND ART

Multiple devices may communicate data over a network. For example, a smartphone may transmit or receive data to and from a server via the Internet. The network may include a private network such as an intranet as well as a public network such as the Internet.

DISCLOSURE

Technical Problem

To control indiscriminate access with respect to a network, a technology for limiting access to the network is being applied based on a transmission control protocol (TCP)/internet protocol (IP).

For example, a NAC (network access controller) allows an authorized terminal to access a network by receiving an authorized IP address, and has a method of blocking unauthorized terminals using an ARP (address resolution protocol) spoofing when an unauthorized terminal uses an unauthorized IP address. A firewall has a method of determining whether to allow transmission of a data packet based on source IP, destination IP, and port information included in IP header information and a policy. A virtual private network (VPN) has a method of ensuring the integrity and confidentiality of data packets by using a tunnel to which encryption is applied over the TCP/IP protocol.

However, the ARP spoofing puts a load on the network, and technologies to bypass it have recently been developed. Since the firewall is for controlling the flow of data packets, it may not be directly involved in the process of generating a connection between two nodes. Also, the VPN is vulnerable to the management of the flow of data packets after the tunnel is generated. In addition, since the above technologies are based on the TCP/IP, security of another layer (e.g., an application layer) among open system interconnection (OSI) layers may be vulnerable.

Various embodiments disclosed in this document are intended to provide a system for solving the above-described problems in a network environment and a method therefor.

Technical Solution

According to an embodiment of the present disclosure, a node includes a communication circuit, a processor operatively connected to the communication circuit, and a memory operatively connected to the processor and that stores a target application and a access control application, and the memory stores instructions that when executed by the processor, cause the node to detect an event of a network access with respect to a destination network of the target application through the access control application, to determine whether a data flow and a tunnel, which correspond to identification information of the target application and the destination network and are authorized from an external server exist through the access control application, to determine whether an inspection of a data packet of the target application is necessary based on data packet inspection information included in the authorized data flow when the authorized data flow and the authorized tunnel exist, to inspect the data packet based on a rule database included in the data packet inspection information when the inspection of the data packet is necessary, and to forward the data packet based on the authorized data flow and the authorized tunnel when the inspection of the data packet is not necessary or when a result of the inspection of the data packet is successful.

According to an embodiment, the instructions may cause the node when the access control application inspects the data packet, to determine whether an inspection method of the data packet included in the rule database is a single inspection or a multiple inspection, to inspect the data packet in units of transmission of the data packet when the inspection method is the single inspection, and to inspect the data packet until a transmission end point of the data packet when the inspection method is the multiple inspection.

According to an embodiment, the instructions may cause the node to determine whether to block or replace the data packet, based on the rule database, to drop the data packet when it is determined to block the data packet, and to replace a part detected in the data packet with replacement information included in the rule database and to forward the replaced data packet when it is determined to replace the data packet.

According to an embodiment, the instructions may cause the node to determine whether to block or copy the data packet based on the rule database, to drop the data packet when it is determined to block the data packet, and to store the data packet in the memory and then to forward the data packet when it is determined to copy the data packet.

According to an embodiment, the instructions may cause the node to detect an event of a data packet reception through the access control application, to determine whether the authorized data flow corresponding to a source IP (Internet Protocol) of a received data packet and service port information exists, to forward the received data packet when the authorized data flow does not exist, to inspect the received data packet through data packet inspection information included in the authorized data flow when the authorized data flow exists, and to process the data packet based on a result of the data packet inspection.

According to an embodiment, the instructions may cause the node to detect an event of a controller access with respect to the external server through the access control application, to request the controller access to the external server using the communication circuit in response to the detected event of the controller access, to receive a first response with respect to the request of the controller access from the external server, the first response being including identification information of the generated control flow and the data packet inspection information, and to update the authorized data flow based on the received data packet inspection information.

According to an embodiment, the instructions may cause the node to receive a first user input requesting a user authentication, and to request a user authentication with respect to a user of the node to the external server using the communication circuit, and the request of the user authentication being including information corresponding to the first user input, to receive a second response with respect to the user authentication request from the external server, the second response being including the data packet inspection information, and to update the authorized data flow based on the received data packet inspection information.

According to an embodiment, the instructions may cause the node to drop the data packet when the authorized data flow does not exist, or to request a network access with respect to the destination network to the external server using the communication circuit, the request of the network access with respect to the destination network being including control flow identification information, identification information of the target application, and identification information of the destination network, to receive a third response with respect to the network access request, the third response being including the data packet inspection information, the tunnel generation information, and generated data flow information, to determine whether an available tunnel and data flow exist, based on the third response, and when the available tunnel and data flow exist, to perform a data packet inspection based on the data packet inspection information, and to process the data packet based on a result of the data packet inspection.

According to an embodiment, the instructions may cause the node to detect an event of a control flow update through the access control application, and to request the control flow update to the external server and to receive a fourth response with respect to the request of the control flow update, the fourth response being including updated control flow information.

According to an embodiment, the instructions may cause the node to receive a second user input requesting a release of the network access, and to request the external server to release the network access in response to the second user input.

According to an embodiment of the present disclosure, a server includes a communication circuit, a memory storing a database, and a processor operatively connected to the communication circuitry and the memory, and the processor receives, from an access control application of a node, a first request requesting a network access with respect to a destination network of a target application stored in the node, the first request being including identification information of a control flow, identification information of the target application, and identification information of the destination network, determines whether the target application and the destination network are accessible based on the identification information of the control flow and the database, generates a data flow including data packet inspection information when the target application and the destination network are accessible, the data packet inspection information being indicating whether an inspection is necessary and including a rule database, generates information necessary for generating a tunnel between the target application and a gateway of the destination network based on the identification information of the target application and the identification information of the destination network, and transmits the generated data flow and the information necessary for generating the tunnel to the node and transfers the information necessary for generating the tunnel to the gateway.

According to an embodiment, the processor may receive a second request requesting a controller access with respect to the server from the access control application, the second request being including identification information of at least one of the node, the access control application, or a network to which the node belongs, may determine whether the node is an accessible device based on the identification information included in the second request and the database, may generate the control flow when the node is the accessible device, may identify the data packet inspection information in the database corresponding to the identification information, and may transmit the generated control flow identification information and the data packet inspection information to the node using the communication circuit.

According to an embodiment, the processor may receive a third request requesting a user authentication with respect to a user of the node from the access control application through the control flow, the third request being including user identification information related to the user authentication, may authenticate the user of the node based on information included in the third request and the database, may add the user identification information to the control flow when the user of the node is authenticated, may identify the data packet inspection information in the database corresponding to information included in the third request, and may transmit the control flow to which the user identification information is added and the data packet inspection information to the node.

According to an embodiment, the processor may receive a fourth request requesting update of the control flow from the node, the fourth request being including identification information of the control flow and data packet information, may inspect the data packet based on the data packet information and the data packet inspection information, may update the control flow and transmit the updated control flow identification information to the node when the data packet inspection is successful, may remove the control flow and remove a tunnel dependent on the control flow when the data packet inspection fails.

According to an embodiment, the data packet information may include at least one of data packet information inspected at the node or data packet information stored in the node.

According to an embodiment, the processor may receive, from the access control application, a fifth request requesting a release of the network access, the fifth request being including the control flow identification information, may remove the control flow corresponding to the identification information included in the fifth request in response to the fifth request, and may remove a tunnel dependent on the removed control flow and transfer information about the removed tunnel to the gateway.

According to an embodiment of the present disclosure, a method of operating a network access control system includes detecting, by an access control application, a transmission event of a data packet, at a node, determining, at the node, whether the data packet needs to be inspected based on data flow information, inspecting, at the node, the data packet based on data packet inspection information included in the data flow information when the inspection of the data packet is necessary, and processing, at the node, the data packet based on a result of the inspection of the data packet.

According to an embodiment, the method may further include detecting, by the access control application, a reception event of the data packet, at the node, determining, at the node, whether the data flow corresponding to identification information included in the received data packet exists, forwarding, at the node, the received data packet when the data flow does not exist, dropping, at the node, the received data packet when the data flow exists but is not valid, and determining, at the node, whether the received data packet needs to be inspected based on the data flow when the data flow exists.

According to an embodiment, the method may further include detecting, at the node, a network access event with respect to a destination network of a target application included in the node through the access control application, and determining whether a data flow and tunnel, which correspond to identification information of the target application and the destination network through the access control application, and authorized from a server exist, identifying, at the node, data packet inspection information included in the authorized data flow when the authorized data flow and the authorized tunnel exist, the data packet inspection information being indicating whether the inspection is necessary and including a rule database, and inspecting, at the node, the data packet based on the rule database when the data packet inspection is necessary, and forwarding, at the node, the data packet based on the authorized data flow and the authorized tunnel when the data packet inspection is not necessary or when a result of the data packet inspection is successful.

According to an embodiment, the method may further include requesting, at the node, a network access with respect to the destination network to the server when the authorized data flow does not exist, determining, at the server, whether the target application and the destination network are accessible based on information included in the network access request and a database included in the server, generating, at the server, a data flow including the data packet inspection information when the target application and the destination network are accessible, generating, at the server, information necessary for generating a tunnel between the target application and a gateway of the destination network based on the identification information of the target application and the identification information of the destination network, transferring, at the server, the generated data flow and the information necessary for generating the tunnel to the node, and transferring the information necessary for generating the tunnel to the gateway, determining, at the node, whether an available tunnel and data flow exist based on information received from the server, and performing, at the node, the data packet inspection when the available tunnel and the data flow exist.

Advantageous Effects

According to the embodiments disclosed in the present disclosure, a node may block a data packet reception of an unauthorized application.

In addition, according to the embodiments disclosed in the present disclosure, compared to network security technologies based on a wide range IP address such as the NAC, it is possible to solve the problem of policy setting and recovery and to prevent bypass attacks.

In addition, according to the embodiments disclosed in the present disclosure, since a man in the middle (MITM) attack may be blocked in a zero trust network environment, tunnel-based access control may be performed compared to the VPN that only provides section protection.

In addition, according to the embodiments disclosed in the present disclosure, it is possible to solve problems inherent in the TCP/IP-based network security technology and to provide a secure network connection.

In addition, according to the embodiments disclosed in the present disclosure, it is possible to solve the problem of setting a policy according to the network control device.

Further, according to the embodiments disclosed in the present disclosure, since the data packet is always inspected, transmission and reception of a data packet may be protected.

In addition to this, various effects identified directly or indirectly through this specification may be provided.

MODE FOR INVENTION

Figure 1:
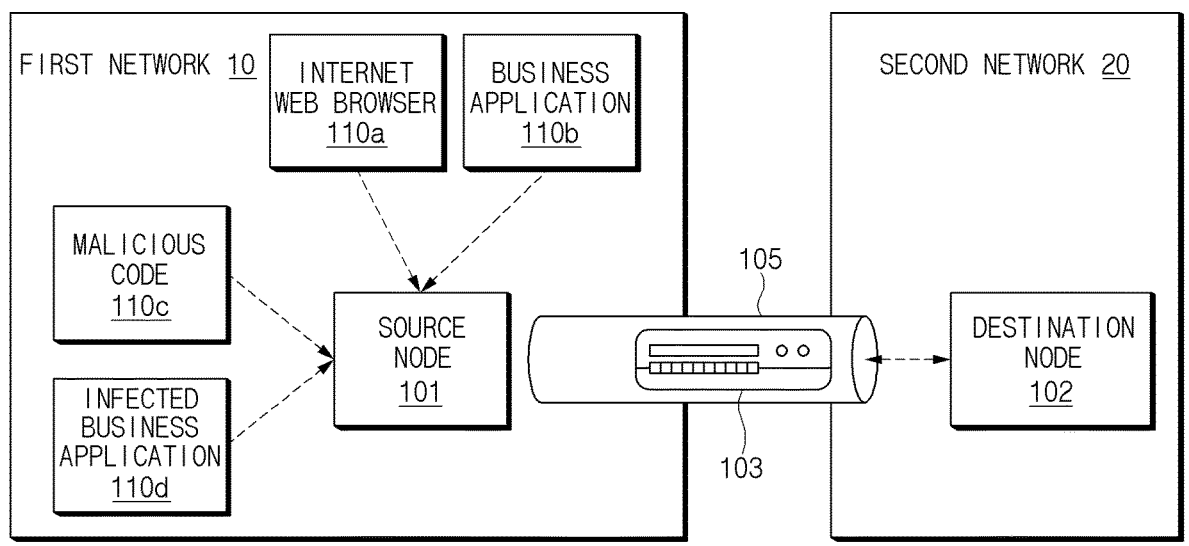
FIG. 1 illustrates an environment including a plurality of networks.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

In this specification, the singular form of a noun corresponding to an item may include one item or a plurality of items, unless the relevant context clearly dictates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when a component (e.g., a first component) is referred to, with or without the term "functionally" or "communicatively", as "coupled" or "connected" to another component (e.g., a second component), it means that the component may be coupled with the other component directly (e.g., wiredly), wirelessly, or via a third component.

Each component (e.g., module or program) of the components described in this specification may include singular or plural entities. According to various embodiments, one or more components or operations among corresponding components may be omitted, or one or more other components or operations may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. According to various embodiments, operations performed by modules, programs, or other components are executed sequentially, in parallel, iteratively, or heuristically, one or more of the operations are executed in a different order, omitted, or one or more other operations may be added.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in the form of an application-specific integrated circuit (ASIC).

Various embodiments of the present disclosure may be implemented as software (e.g., a program or application) including one or more instructions stored in a storage medium (e.g., a memory) readable by a machine. For example, a processor of the machine may invoke at least one command among one or more instructions stored from a storage medium and execute it. This enables the machine to be operated to perform at least one function according to the at least one instruction invoked. The one or more instructions may include code generated by a compiler or code executable by an interpreter. The machine-readable storage medium may be provided in the form of a non-transitory storage medium. Here, 'non-transitory' only means that the storage medium is a tangible device and does not contain a signal (e.g., electromagnetic waves), and this term does not distinguish between a case where data are semi-permanently stored in a storage medium and a case where data are temporarily stored.

Methods according to various embodiments disclosed in this document may be provided by being included in a computer program product. The computer program products may be traded between sellers and buyers as commodities. The computer program product may be distributed in the form of a machine-readable storage medium (e.g., a compact disc read only memory (CD-ROM)), or may be distributed directly or online (e.g., downloaded or uploaded) through an application store or between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

FIG. 1 illustrates an environment including a plurality of networks.

Referring to FIG. 1, a first network 10 and a second network 20 may be different networks. For example, the first network 10 may be a public network such as the Internet, and the second network 20 may be a private network such as an intranet or the VPN.

The first network 10 may include a source node 101. In FIG. 1 and the embodiments described below, the 'source node' may be various types of devices capable of performing data communication. For example, the source node 101 may be a portable device such as a smartphone or tablet, a computer device such as a desktop or laptop, a multimedia device, a medical device, a camera, a wearable device, a virtual reality (VR) device, or home appliances, and is not limited to the above-mentioned devices. For example, the source node 101 may include a server or gateway that may transmit data packets through an application. The source node 101 may also be referred to as an 'electronic device' or a 'terminal'. Meanwhile, a destination node 102 may include the same or similar device as the above-described source node 101.

The source node 101 may attempt to access the second network 20 and may transmit data to the destination node 102 included in the second network 20. The source node 101 may transmit data to the destination node 102 through a gateway 103 and a tunnel 105.

When an access of the source node 101 with respect to the first network 10 is approved, the source node 101 may communicate with all servers included in the first network 10, so that the source node 101 may be exposed to attacks by malicious programs. For example, the source node 101 may receive data of untrusted or unsecured applications such as a malicious code 110c and an infected business application 110d, as well as data of trusted and/or secure applications such as an internet web browser 110a and a business application 110b.

The source node 101 infected by a malicious program may attempt to access and/or to transmit data to the second network 20. When the second network 20 is formed based on IP, such as a VPN, it may be difficult for the second network 20 to individually monitor a plurality of devices included in the second network 20, and security may be vulnerable to an application layer or a transmission layer in OSI layers. In addition, when the source node 101 includes a malicious application after the tunnel is generated in advance, the data of the malicious application will be transferred to another electronic device (e.g., the destination node 102) within the second network 20.

Figure 2:
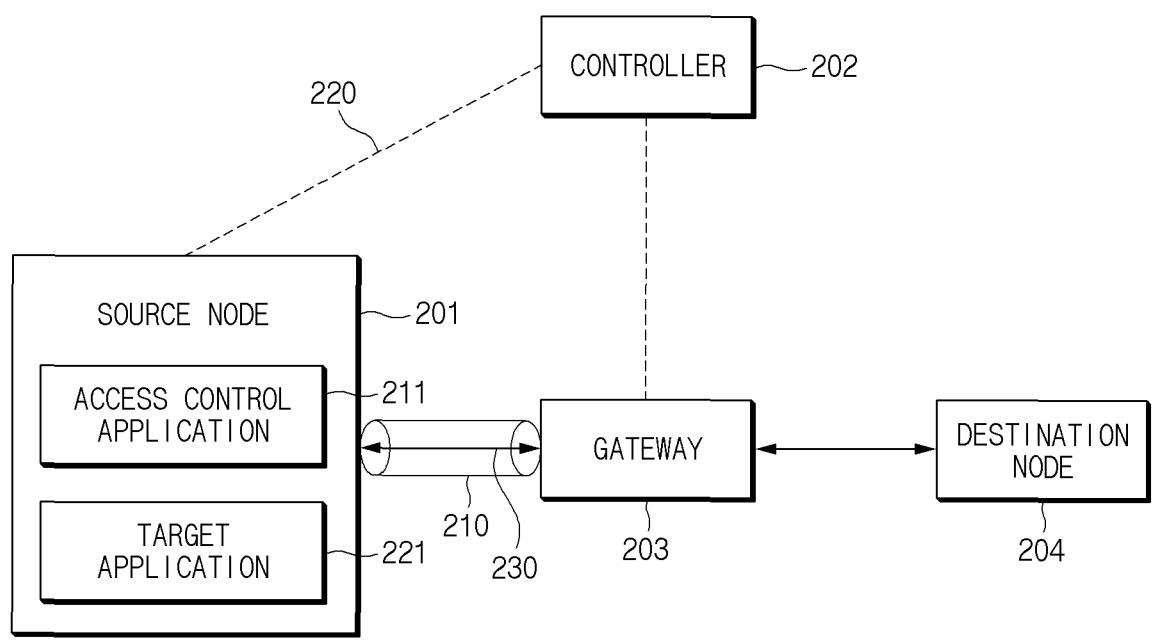
FIG. 2 illustrates an architecture in a network environment according to various embodiments.

FIG. 2 illustrates an architecture in a network environment according to various embodiments.

Referring to FIG. 2, the number of a source node 201, a gateway 203, and a destination node 204 is not limited to the number illustrated in FIG. 2. For example, the source node 201 may transmit data to a plurality of destination nodes through a plurality of gateways, and a controller 202 may manage a plurality of source nodes, gateways, and destination nodes. The source node 201 may perform the same and similar functions as the source node 101 illustrated in FIG. 1, the gateway 203 may perform the same and similar functions as the gateway 103 illustrated in FIG. 1, and the destination node 204 may perform the same and similar functions as the destination node 102 illustrated in FIG. 1.

The controller 202 may be, for example, a server (or cloud server). The controller 202 may ensure reliable data transmission within a network environment by managing data transmission between the source node 201, the gateway 203, and the destination node 204. For example, the controller 202 may manage the access of the source node 201 with respect to the destination node 204 through policy information or blacklist information, may mediate the generation of an authorized tunnel 210 between the source node 201 and the gateway 203, or may remove the tunnel 210 according to security events collected from the source node 201 or the gateway 203. The source node 201 may communicate with the destination node 204 only through the tunnel 210 authorized by the controller 202, and when the authorized tunnel 210 does not exist, the source node 201 may be blocked from accessing the destination node 204. According to an embodiment, the controller 202 exchanges control data packets with the source node 201 to perform various operations (e.g., registration, approval, authentication, update, termination) associated with the network access of the source node 201. In addition, the controller 202 may transmit and receive control data packets to and from the destination node 204 in order to perform various operations (e.g., registration, approval, authentication, update, termination) associated with the network access and network reception of the destination node 204. A flow (e.g., 220 or 240) through which control data packets are transmitted may be referred to as a control flow.

Meanwhile, the controller 202 may include a server or an external server.

The gateway 203 may be located at the border of the network to which the source node 201 belongs or the border of the network to which the destination node 204 belongs. There may be multiple gateways 203. The gateway 203 may forward only data packets received through the authorized tunnel 210 among the data packets received from the source node 201 to the destination node 204. A flow (e.g., 230) in which data packets are transmitted between the source node 201 and the gateway 203, the gateway 203 and the destination node 204, or the source node 201 and the destination node 204 may be referred to as a data flow. Compared to the tunnel 210 generated on a terminal or an IP unit, the data flow may be generated in more detailed units (e.g., application). According to an embodiment, the gateway 203 may be connected to the controller 202 on a cloud basis. The gateway 203 may generate the source node 201 and the authorized tunnel 210 under the control of the controller 202.

According to various embodiments, the source node 201 may include an access control application 211 for managing a network access of applications stored in the source node 201 and a network driver (not illustrated). For example, when an access event occurs for the destination node 204 of a target application 221 (e.g., any one of the applications 110a to 110d in FIG. 1) included in the source node 201, the access control application 211 may determine whether the target application 221 is accessible. When the target application 221 is accessible, the access control application 211 may transmit a data packet to the gateway 203 through the tunnel 210. The access control application 211 may control the transmission of data packets within the source node 201 through a kernel including an operating system and a network driver.

Figure 3:
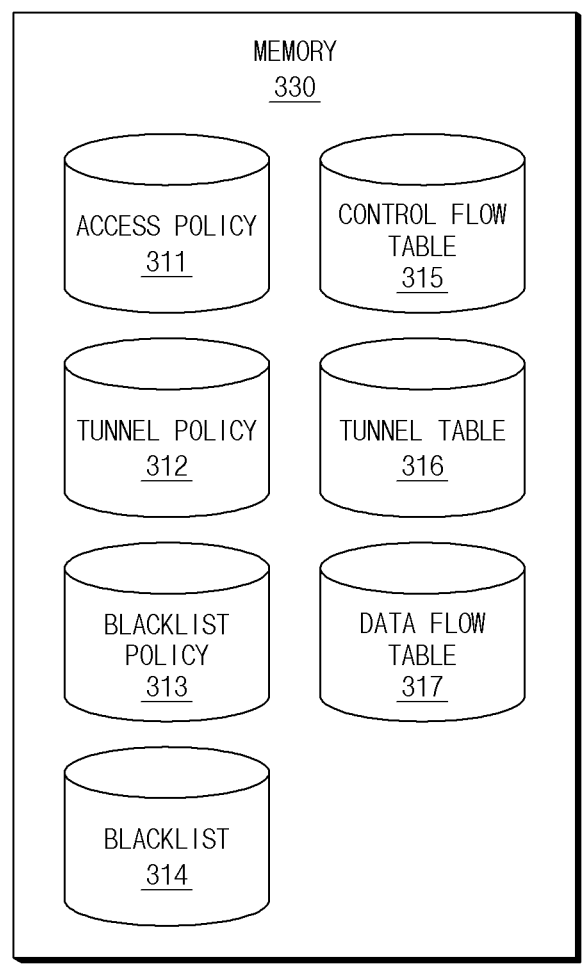
FIG. 3 is a functional block diagram illustrating a database stored in a controller according to various embodiments.

FIG. 3 is a functional block diagram illustrating a database stored in a controller (e.g., the controller 202 of FIG. 2) according to various embodiments. Although FIG. 3 illustrates only a memory 330, the controller may further include a communication circuit (a communication circuit 430 in FIG. 4) for communicating with an external electronic device (e.g., the source node 201, the gateway 203, or the destination node 204 of FIG. 2), and a processor (e.g., a processor 410 in FIG. 4) for controlling the overall operation of the controller.

Referring to FIG. 3, the controller may store databases 311 to 317 for controlling network access and data transmission in the memory 330.

The access policy database 311 may include information about networks and/or services to which an identified network, source node, destination node, user, or application are accessible. For example, when an access to a destination node is requested from a source node, the controller may determine whether the identified network (e.g., the network to which the source node belongs), the source node, the user (e.g., the user of the source node), and/or an application (e.g., the application included in the source node) are accessible to the destination node, based on the access policy database 311. In an embodiment, the access policy database 311 may include data packet inspection information. For example, the data packet inspection information may indicate whether data packet inspection is necessary and may include a rule database. In this case, the rule database may include at least one of data packet inspection methods (e.g., single data packet inspection, multiple data packet inspection), patterns to be applied when inspecting data packets, locations to apply when inspecting data packets, and post-inspection processing methods (e.g., data packet blocking, data packet replacement, and data packet copying).

The tunnel policy database 312 may include the type, encryption method, and encryption level information of the tunnel to be connected to the gateway existing at the border of the network and the source node (e.g., the terminal) on a connection path. For example, when the access to the destination node is requested from the source node, the controller may provide the source node with the optimal tunnel for accessing the destination node and information about it based on the tunnel policy database 312.

The blacklist policy database 313 may include a policy for permanently or temporarily blocking the access to a specific node (e.g., a source node or a destination node). The blacklist policy database 313 may be generated based on information (e.g., at least one of a source node ID (identifier), an IP address, a MAC (media access control) address, or a user ID) identified through analysis of security event risk, occurrence period, and/or behavior among security events periodically collected from the source node, destination node, or gateway.

The blacklist database 314 may include a list of at least one of a source node, a destination node, an IP address, a MAC address, or a user blocked by the blacklist policy database 313. For example, when the identification information of the source node requesting the access to the destination node is included in the blacklist database 314, the controller may isolate the source node from the destination node by rejecting the access request of the source node.

A control flow table 315 is an example of a session table for managing a flow (e.g., the control flow) of control data packets generated between the node (e.g., the source node or the destination node) and the controller. When successfully accessing to the controller, the control flow information may be generated by the controller. The control flow information may include at least one of control flow identification information, an IP address identified when accessing to and authenticating the controller, a node ID, or a user ID. For example, when the access to a destination node is requested from a source node, the controller may retrieve the control flow information through the control flow identification information received from the source node, and may map at least one of the IP address, source node ID, or user ID included in the retrieved control flow information to the access policy database 311, thereby determining whether the access of the source node is possible and whether to generate a tunnel.

According to an embodiment, the control flow may have an expiration time. A node (e.g., a source node or a destination node) should update the expiration time of the control flow, and when the expiration time is not updated within a certain period of time, the control flow (or the control flow information) may be removed. Additionally, when it is determined that immediate access blocking is necessary according to security events collected from a node or gateway, the controller may remove the control flow according to access termination request of the node. When the control flow is removed, the tunnel generated in advance and the data flow are also removed, so the access of the node may be blocked.

A tunnel table 316 is a table for managing tunnels connected between the source node and the gateway. The tunnel may be generated in a device unit or IP unit, for example. When a tunnel is generated between a source node and a gateway, the tunnel table 316 may include tunnel identification information, control flow identification information when the tunnel is dependent on a control flow, a tunnel end point (TEP), a tunnel start point (TSP), a tunnel algorithm, a tunnel type, and/or additional information for managing a tunnel.

A data flow table 317 is a table for managing the flow (e.g., the data flow) in which detailed data packets are transmitted between the source node and the destination node. The data flow may be generated in units of a TCP session within a tunnel generated at the source node or IP unit, an application at the source node, or a more granular level. The data flow table 317 may include data flow identification information, control flow identification information when the data flow is dependent on the control flow, an application ID, a destination IP address, and/or service ports to identify whether the data packet transmitted from the source node is an authorized data packet. Additionally, the data flow table 317 may include identification information of the tunnel through which the data flow will be used. Also, the data flow table 317 may include a header (or header information) to determine whether a data packet is valid. In addition, the data flow table 317 may further include whether a data flow header, which is authentication information, is inserted into the data packet, a header insertion method, whether authentication of the data flow is required, authentication status, and/or authentication expiration time. Additionally, the data flow table 317 may include source node information (e.g., source IP) of the destination node, service port information, and receivable application information. In an embodiment, the data flow table 317 may include data packet inspection information. For example, the data packet inspection information may indicate whether data packet inspection is necessary and may include a rule database. In this case, the rule database may include at least one of data packet inspection methods (e.g., single data packet inspection, multiple data packet inspection), patterns to be applied when inspecting data packets, locations to apply when inspecting data packets, and post-inspection processing methods (e.g., data packet blocking, data packet replacement, and data packet copying).

Figure 4:
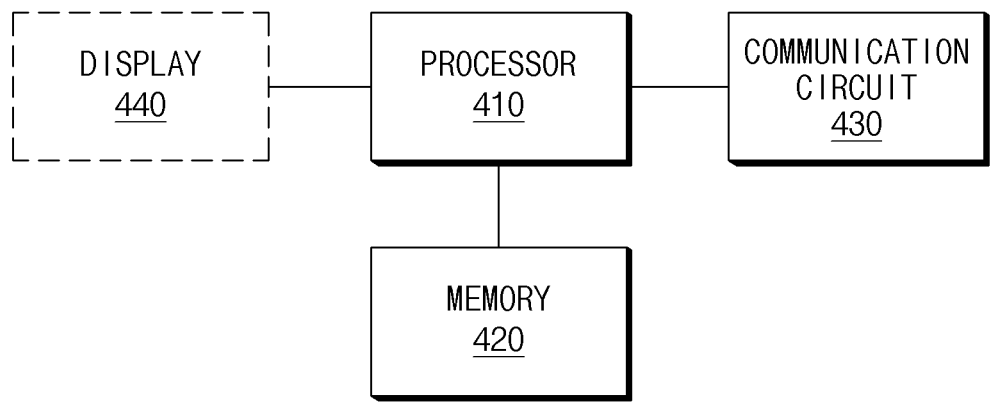
FIG. 4 is a functional block diagram of a node according to various embodiments.

FIG. 4 illustrates a functional block diagram of a node (e.g., the source node 201 and the destination node 204 of FIG. 2) according to various embodiments.

Referring to FIG. 4, a node may include the processor 410, a memory 420, and the communication circuit 430.

According to an embodiment, the node may further include a display 440 to interface with the user.

The processor 410 may control the overall operation of the node. In various embodiments, the processor 410 may include one processor core (single core) or may include a plurality of processor cores. For example, the processor 410 may include a multi-core such as a dual-core, a quad-core, a hexa-core, or the like. According to embodiments, the processor 410 may further include a cache memory located internally or externally. According to embodiments, the processor 410 may be configured with one or more processors. For example, the processor 410 may include at least one of an application processor, a communication processor, or a graphical processing unit (GPU).

All or a portion of processor 410 may be electrically or operatively coupled with or connected to other components (e.g., the memory 420, the communication circuit 430, or the display 440) within the node. The processor 410 may receive commands from other components of the node, may interpret the received commands, and may perform calculations or process data according to the interpreted commands. The processor 410 may interpret and process messages, data, instructions, or signals received from the memory 420, the communication circuit 430, or the display 440. The processor 410 may generate new messages, new data, new instructions, or new signals based on received messages, data, instructions, or signals. The processor 410 may provide processed or generated messages, data, instructions, or signals to the memory 420, the communication circuit 430, or the display 440.

The processor 410 may process data or signals created or generated by a program. For example, the processor 410 may request instructions, data, or signals from the memory 420 to execute or control a program. The processor 410 may record (or store) or update instructions, data, or signals to the memory 420 in order to execute or control a program.

The memory 420 may store instructions for controlling nodes, control instruction codes, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read only memory (ROM), a programmable ROM (PROM), an electrically programmable ROM (EPROM), an electrically erasable programmable ROM (EEPROM), a flash memory, and the like.

The memory 420 may further include non-volatile media such as a hard disk drive (HDD), a solid state disk (SSD), an embedded multi media card (eMMC), and universal flash storage (UFS).

According to an embodiment, the memory 420 may store some of the information included in the memory (e.g., the memory 330 in FIG. 3) of the controller. For example, the memory 420 may store the tunnel table 316 and the data flow table 317 described in FIG. 3.

The communication circuit 430 may support establishment of a wired or wireless communication connection between a node and an external electronic device (e.g., the controller 202 or gateway 203 of FIG. 2) and performing communication through the established connection. According to an embodiment, the communication circuit 430 may include a wireless communication circuit (e.g., a cellular communication circuit, a short-range wireless communication circuit, or a global navigation satellite system (GNSS) communication circuit) or a wired communication circuit (e.g., a local area network (LAN)) communication circuit, or power line communication circuit), and may communicate with external electronic devices using the corresponding communication circuit, through a short-range communication network such as Bluetooth, WiFi direct, or IrDA (infrared data association) or a long-distance communication such as a cellular network, the Internet, or a computer network. The various types of communication circuits 430 described above may be implemented as one chip or may be implemented as separate chips.

The display 440 may output content, data, or signals. In various embodiments, the display 440 may display image data processed by the processor 410. According to embodiments, the display 440 may be configured with an integrated touch screen by being combined with a plurality of touch sensors (not illustrated) capable of receiving touch input, and the like. When the display 440 is configured with the touch screen, the plurality of touch sensors may be placed above the display 440 or below the display 440.

Meanwhile, a server (e.g., the controller) according to an embodiment may include the processor 410, the memory 420, and the communication circuit 430. The processor 410, the memory 420, and the communication circuit 430 included in the server may be actually the same as the processor 410, the memory 420, and the communication circuit 430 described above.

Figure 5:
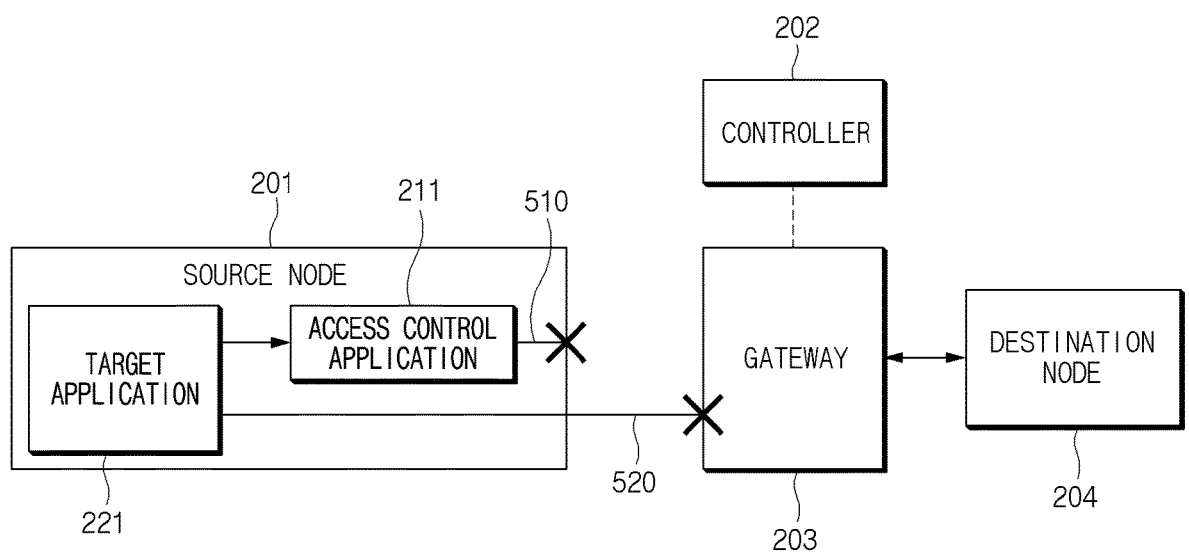
FIG. 5 illustrates an operation of controlling reception of a data packet according to various embodiments.

FIG. 5 illustrates an operation of controlling reception of a data packet according to various embodiments.

Referring to FIG. 5, the access control application 211 may detect an access request to the destination network including the destination node 204 of the target application 221, and may determine whether the source node 201 or the target application 221 is connected to the controller 202. When the source node 201 or the target application 221 is not connected to the controller 202, the access control application 211 may block reception of data packets from the kernel including the operating system or the network driver (operation 510). Additionally, when a data packet is received or transmitted, the access control application 211 may inspect the data packet and may ensure the safety of the received or transmitted data packet. Through the access control application 211, the source node 201 may block access of malicious applications in advance at the application layer of the OSI layer.

According to another embodiment, when the access control application 211 is not installed on the source node 201 or a malicious application bypasses the control of the access control application 211, unauthorized data packets are transmitted from the source node 201. In this case, the gateway 203 located at the border of the network blocks data packets received through an unauthorized tunnel (operation 520), so the data packet (e.g., data packet for generating the TCP session) transmitted from the source node 201 may not reach the destination node 204. In other words, the source node 201 may be isolated from the destination node 204.

Figure 6:
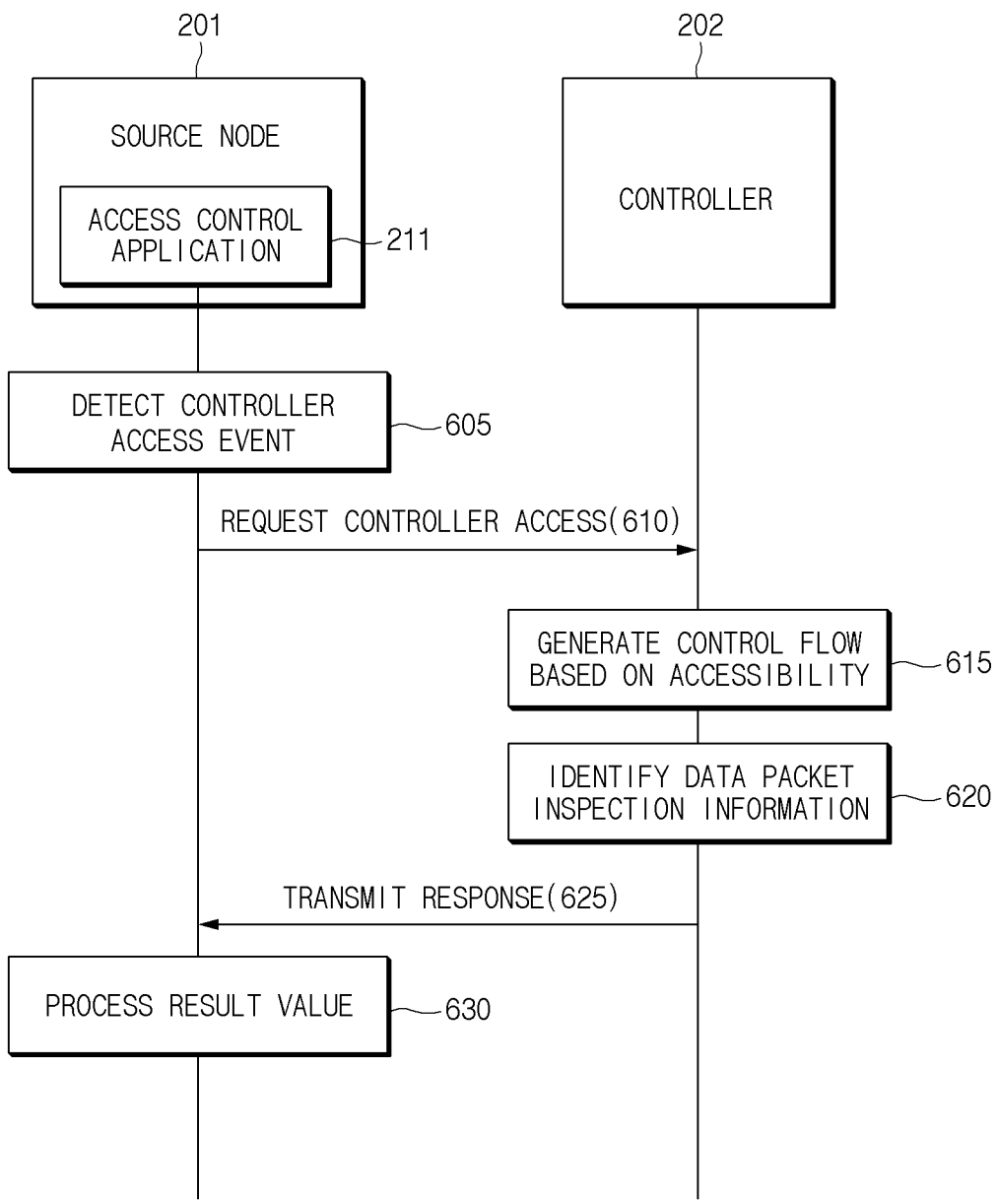
FIG. 6 illustrates a signal flow diagram for a controller access according to various embodiments.
Figure 7:
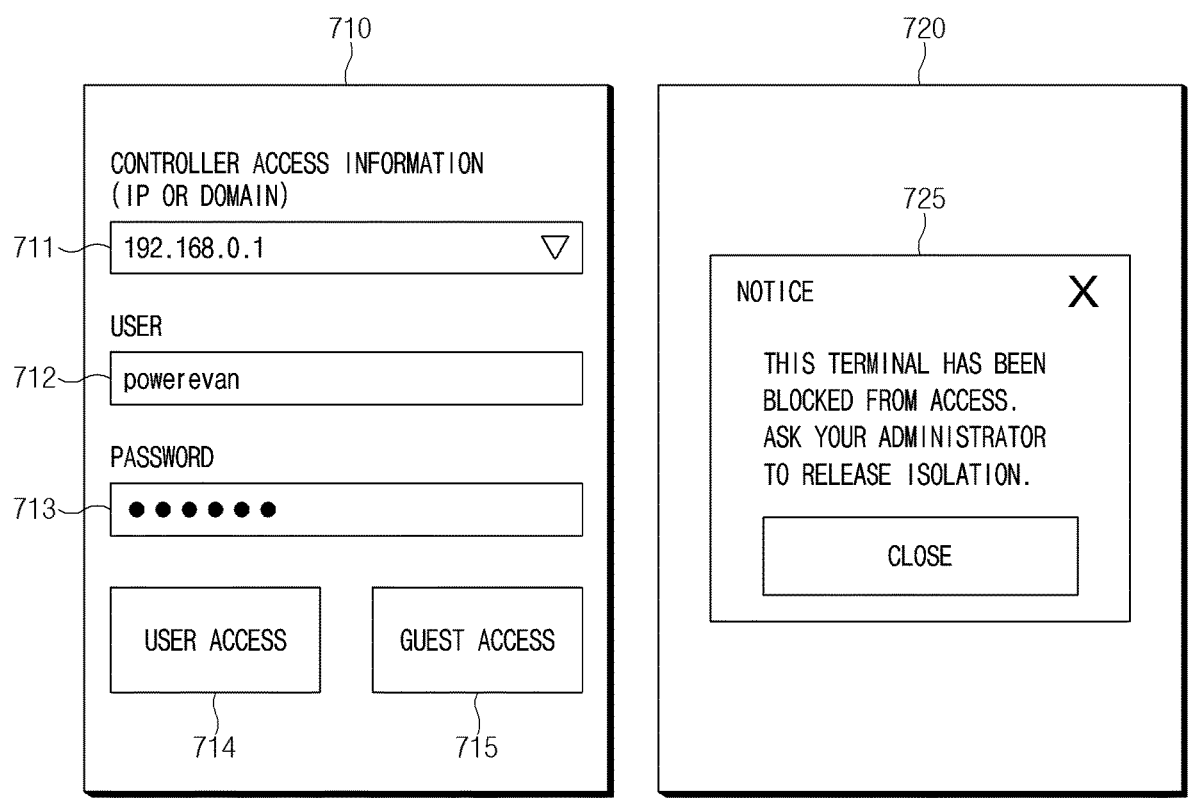
FIG. 7 illustrates a user interface screen for a controller access according to various embodiments.

FIGS. 6 to 7 describes operations for a controller access according to various embodiments. FIG. 6 illustrates a signal flow diagram for a controller access, and FIG. 7 illustrates a user interface screen for a controller access.

Since the source node 201 needs to be authorized by the controller 202 to access or receive the network, the access control application 211 of the source node 201 may attempt to access the controller of the source node 201 by requesting the controller 202 to generate a control flow. In this case, the source node 201 may include the source node 201 in FIG. 2. Additionally, the access control application 211 may include the access control application 211 in FIG. 2.

Referring to FIG. 6, in operation 605, the source node 201 may detect a controller access event. For example, the access control application 211 is installed and executed within the source node 201, and the source node 201 may detect that access to the controller 202 is requested through the access control application 211.

For example, referring to FIG. 7, when the access control application 211 is executed, the source node 201 may display a user interface screen 710 for receiving information necessary for controller access. The user interface screen 710 may include an input window 711 for entering the IP or domain of the controller 202, an input window 712 for entering a user ID, and/or an input window 713 for entering a password. After information about the input windows 711 to 713 is input, the source node 201 may detect the controller access event by receiving a button 714 for a controller access by an authenticated user. For another example, when user authentication of the source node 201 is not yet completed, the source node 201 may detect the controller access event by receiving a button 715 for a controller access by an unauthorized user (i.e., a guest).

In operation 610, the source node 201 may request the controller access to the controller 202 in response to detecting the controller access event. The source node 201 may request the controller access through the access control application 211. According to an embodiment, the access control application 211 may transmit identification information (e.g., a terminal ID, an IP address, and a MAC address) of the source node 201, identification information of type, location, environment, and network to which the source node 201 belongs and/or identification information of the access control application 211 to the controller 202.

In operation 615, the controller 202 may determine whether the source node 201 is accessible in response to the received request. According to an embodiment, the controller 202 may determine whether the source node 201 is accessible based on a database included in the memory (e.g., the memory 330 in FIG. 3) of the controller 202. For example, the controller 202 may determine whether the source node 201 is accessible based on whether information received from the access control application 211 is included in the access policy database, and whether the identification information of the source node 201 and/or the network to which the source node 201 belongs is included in the blacklist database.

When the source node 201 is accessible, the controller 202 may generate a control flow between the source node 201 and the controller 202. In this case, the controller 202 may generate the control flow identification information in the form of random numbers and may store the identification information of the source node 201 and/or the network to which the source node 201 belongs in the control flow table. Information (e.g., the control flow identification information and/or the control flow information) stored in the control flow table may be used for user authentication of the source node 201, information update of the source node 201, policy verification for network access of the source node 201, and/or validation check.

In operation 620, the controller 202 may identify the data packet inspection information in an access policy that matches information identified in the information received from the access control application 211 and is included in the access policy database. For example, the data packet inspection information indicates whether data packet inspection is necessary and may include rule database information. In this case, the rule database information may include information on data packet inspection methods, inspection patterns, and post-inspection processing methods.

In operation 625, the controller 202 may transmit a response to the controller access request to the source node 201. In this case, the controller 202 may transmit the generated control flow identification information to the source node 201. In an embodiment, in operation 625, the controller 202 may further transmit the data packet inspection information identified in the access policy to the source node 201.

In operation 630, the source node 201 may process a result value according to the received response. For example, the access control application 211 may store the received control flow identification information and may display a user interface screen indicating that the controller access is complete to the user. When the controller access is completed, the network access request for the destination network of the source node 201 or the network reception request from the source network of the source node 201 may be controlled by the controller 202. In an embodiment, when the received response includes data packet inspection information, the source node 201 may update the data flow information stored in the source node 201 based on the data packet inspection information.

According to another embodiment, the controller 202 may determine that the source node 201 is inaccessible. For example, when the identification information of the source node 201 and/or the network to which the source node 201 belongs is included in the blacklist database, the controller 202 may determine that the source node 201 is inaccessible. In this case, in operation 615, the controller 202 may not generate the control flow, and in operation 620, may transmit a response indicating that the source node 201 is inaccessible to the controller.

Upon receiving a response indicating that access to the source node 201 is impossible, in operation 625, the source node 201 may output the user interface screen indicating that access to the controller is not possible to the user. For example, referring to FIG. 7, the source node 201 may display a user interface screen 720 through the access control application 211. The user interface screen 720 indicates that access to the source node 201 is blocked and may include a user interface 725 that guides the release of isolation by an administrator (e.g., the controller 202).

Figure 8:
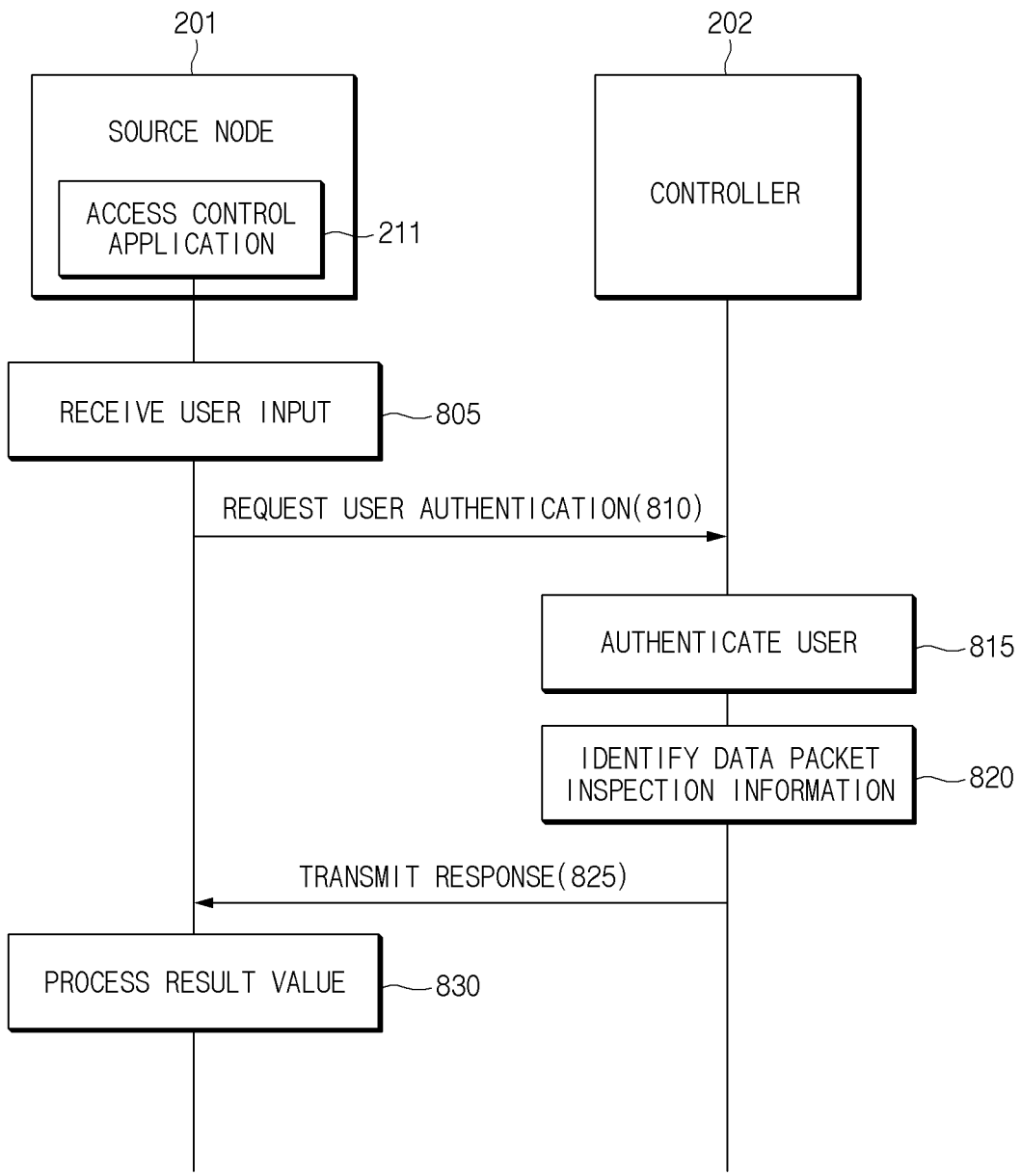
FIG. 8 illustrates a signal flow diagram for a user authentication according to various embodiments.

FIG. 8 illustrates a signal flow diagram for a user authentication according to various embodiments.

In order for the source node 201 (e.g., the source node 201 in FIG. 2) to be granted detailed access rights to the destination network, the access control application 211 (e.g., the access control application 211 in FIG. 2) of the source node 201 may receive authentication for the user of the source node 201 from the controller 202.

Referring to FIG. 8, in operation 805, the source node 201 may receive an input for user authentication. The input for user authentication may be, for example, a user input of entering a user ID and password. For another example, the input for user authentication may be a user input for enhanced authentication (e.g., biometric information).

In operation 810, the source node 201 may request user authentication to the controller 202. For example, the access control application 211 may transmit input information for user authentication to the controller 202. When a control flow between the source node 201 and the controller 202 is already generated, the access control application 211 may transmit input information for user authentication along with control flow identification information.

At operation 815, the controller 202 may authenticate the user based on information received from the source node 201. For example, the controller 202 may determine whether the user is accessible according to the access policy and whether the user is included in the blacklist, based on the user ID, the password, and/or enhanced authentication information included in the received information and the database (e.g., the access policy database 311 or the blacklist database 314 of FIG. 3) included in the memory of the controller 202.

When the user is authenticated, the controller 202 may add the user's identification information (e.g., user ID) to the identification information of the control flow. The added user identification information may be used to a controller access or a network access of the authenticated user.

In operation 820, the controller 202 may identify the data packet inspection information in an access policy that corresponds to information identified in the information received from the source node 201 and is included in the access policy database. For example, the data packet inspection information may indicate whether data packet inspection is necessary and may include the rule database information. In this case, the rule database information may include information on data packet inspection methods, inspection patterns, and post-inspection processing methods.

In operation 825, the controller 202 may transmit information indicating that the user is authenticated to the source node 201 in response to the user authentication request. In an embodiment, the controller 202 may transmit the identified data packet inspection information to the source node 201.

In operation 830, the source node 201 may process a result value of user authentication. For example, the source node 201 may output a user interface screen indicating that user authentication is complete to the user through a display. In an embodiment, when the source node 201 receives the data packet inspection information from the controller 202, the source node 201 may update data flow information based on the received data packet inspection information.

According to another embodiment, the controller 202 may determine that user authentication is not possible. For example, when the identification information of the user is included in the blacklist database, the controller 202 may determine that user authentication is not possible. In this case, in operation 820, the controller 202 may transmit information indicating that user authentication is impossible to the source node 201, and in operation 825, the source node 201 may output a user interface screen indicating that user authentication fails through a display.

Figure 9:
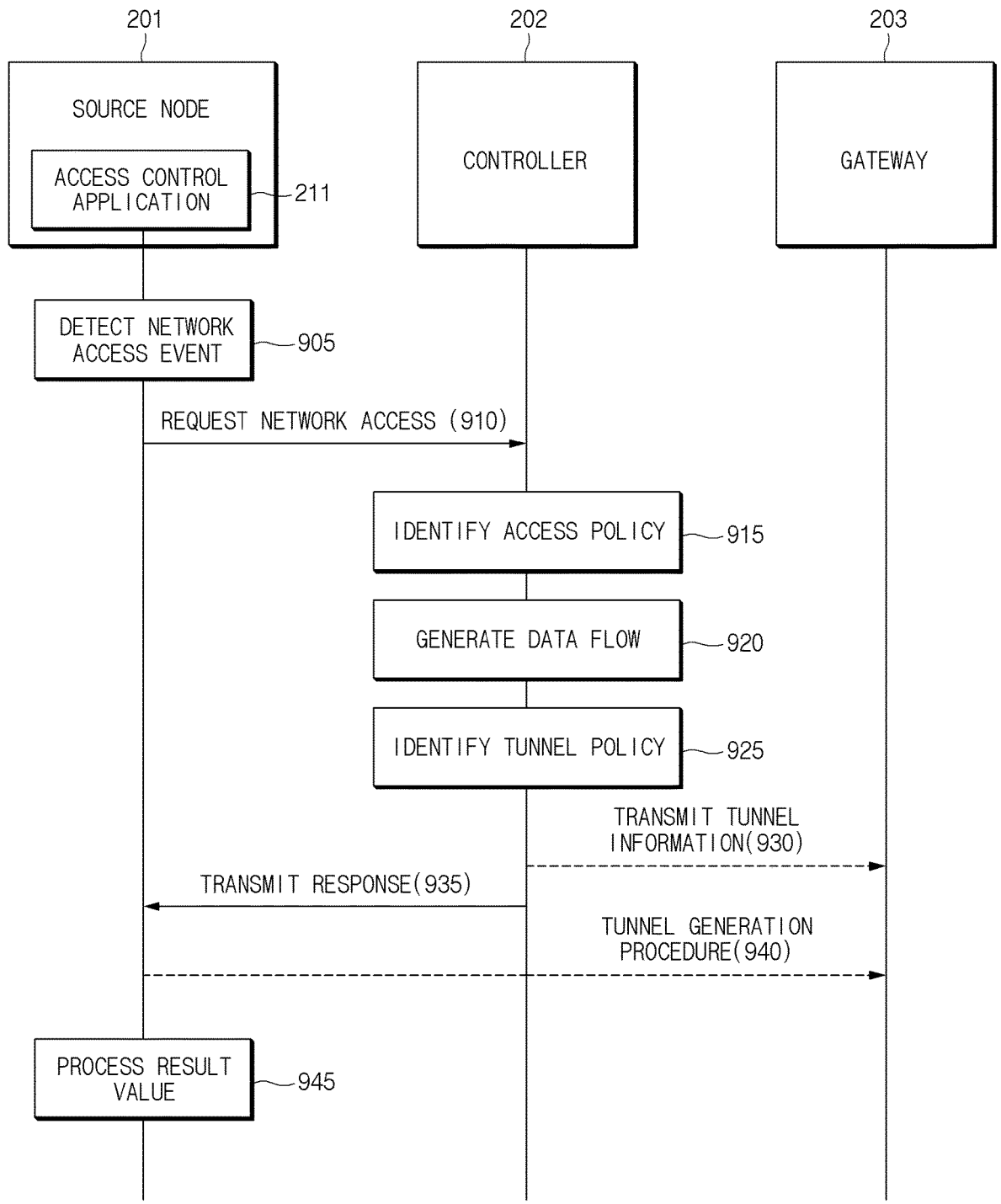
FIG. 9 illustrates a signal flow diagram for controlling a network access according to various embodiments.

FIG. 9 illustrates an operation for controlling a network access according to various embodiments. FIG. 9 illustrates a signal flow diagram for controlling a network access.

After the source node 201 is authorized by the controller 202, the source node 201 may ensure trusted data transmission by controlling the network access of other applications stored in the source node 201 through the access control application 211 of the source node 201.

Referring to FIG. 9, in operation 905, the access control application 211 may detect a network access event. For example, the access control application 211 may detect that a target application, such as a web browser, attempts to access to a target network that includes the destination node 204, such as the Internet. For example, the user may run a web browser and enter and invoke the web address to be accessed.

In operation 910, the access control application 211 may request the network access of the target application to the controller 202. In this case, the access control application 211 may transmit identification information of the target application and identification information (e.g., IP of the destination node and service port information) of the destination node 204 together with identification information of the control flow generated between the source node 201 and the controller 202 to the controller 202.

In operation 915, the controller 202 may identify an access policy based on the request received from the access control application 211 and the database of the controller 202. For example, the controller 202 may determine whether the target application is accessible based on whether information received from the access control application 211 satisfies the access policy included in the database of the controller 202. When an access to the target application is not possible, in operation 935, the controller 202 may transmit information indicating that the access is not possible to the source node 201. In this case, the access control application 211 may drop the data packet of the target application and may output a user interface screen indicating that access to the network is impossible through the display.

When the target application is accessible, in operation 920, the controller 202 may generate a data flow corresponding to the received identification information. For example, the controller 202 may generate a data flow including an accessible application, a destination node IP, service port information, and data packet inspection information in the access policy database included in the controller 202 that matches the identification information included in the network access request of the access control application 211. For another example, the controller 202 may update the data flow table included in an existing database based on the generated data flow.

When the data flow is generated, in operation 925, the controller 202 may identify the tunnel policy. For example, the controller 202 may determine whether an authorized tunnel exists between the source node 201 and the gateway 203. For example, the controller 202 may identify the tunnel end point (TEP) and/or tunnel type in the tunnel policy corresponding to the destination node 204, and may determine whether the authorized tunnel corresponding to the identified TEP exists in the tunnel table. When the authorized tunnel exists, the controller 202 may generate the tunnel ID of the previously generated tunnel and information included in the data flow table, and may transmit it to the source node 201 in operation 935. For another example, when the authorized tunnel does not exist, the controller 202 may generate information (e.g., tunnel type, method, authentication information, and/or IP and service port of the TEP) necessary to generate the tunnel and information included in the data flow table, and may transmit the generated information to the gateway 203 and the source node 201 (operations 930 and 935).

For another example, when there is no tunnel that satisfies the tunnel policy among the tunnels to be generated between the source node 201 and the gateway 203, in operation 935, the controller 202 may notify the source node 201 that network access is not available. In this case, the access control application 211 may drop the data packet of the target application.

In operation 935, the controller 202 may transmit a response with respect to the network access request (operation 910) of the access control application 211. For example, the controller 202 may transmit information about the generated data flow and information necessary for tunnel generation to the access control application 211.

In operation 945, the access control application 211 may process the result value according to the response received in operation 935. According to an embodiment, when information indicating that the network access of the target application is impossible or that the authorized tunnel does not exist is received from the controller 202, the access control application 211 may drop the data packet and may output the user interface screen indicating that the network access is impossible.

According to another embodiment, when information necessary for tunnel generation is received from the controller 202, in operation 940, the access control application 211 may generate a tunnel with the gateway 203. However, when it is determined that tunnel generation is not necessary, the access control application 211 may not perform operation 940.

According to another embodiment, upon receiving the tunnel ID of an existing tunnel from the controller 202, the access control application 211 may perform operation 945 without performing an additional tunnel generation procedure.

According to another embodiment, when tunnel generation fails, the access control application 211 may drop the data packet of the target application and may output a user interface screen indicating that network access is impossible.

According to another embodiment, when the access control application 211 receives data packet inspection information from the controller 202, the access control application 211 may update the data packet inspection information in the data flow table.

After performing the above-described operations, in operation 945, the access control application 211 may perform a data packet transmission procedure (described later in FIG. 13).

According to an embodiment, before performing operation 910, the access control application 211 may first determine whether there is an authorized data flow and authorized tunnel information from the controller 202 between the target application and the destination node 204. For example, the access control application 211 may identify identification information of the target application, identification information (e.g., the destination IP) of the destination node 204, and the service port information, may determine whether the authorized data flow corresponding to the information identified in the data flow table stored in the memory of the source node 201 exists, and may determine whether the authorized tunnel exists in the authorized data flow. When the authorized tunnel does not exist, the access control application 211 may drop the data packet of the target application. When the authorized data flow exists and authorized tunnel information exists in the authorized data flow, a data packet transmission procedure may be performed. When the authorized data flow does not exist, the access control application 211 may request network access in operation 910. Meanwhile, when the authorized data flow exists but is not valid (e.g., a state in which data packets cannot be transmitted and are rejected by the controller), the access control application 211 may drop the data packet of the target application.

According to an embodiment, the access control application 211 may further perform validation check of the target application before requesting network access to ensure the integrity and stability of the target application. For example, the access control application 211 may perform inspection of whether the target application is forged or altered, a code signing inspection, and/or a fingerprint inspection. For another example, the access control application 211 may determine whether the target application, access target IP, and service port are accessible based on the access policy database received from the controller 202. When the validation inspection of the target application fails, the access control application 211 may drop the data packet of the target application without requesting network access. In this case, the access control application 211 may display a user interface screen indicating that access is impossible. When the validation inspection of the target application is successful, in operation 910, the access control application 211 may request network access.

Figure 10:
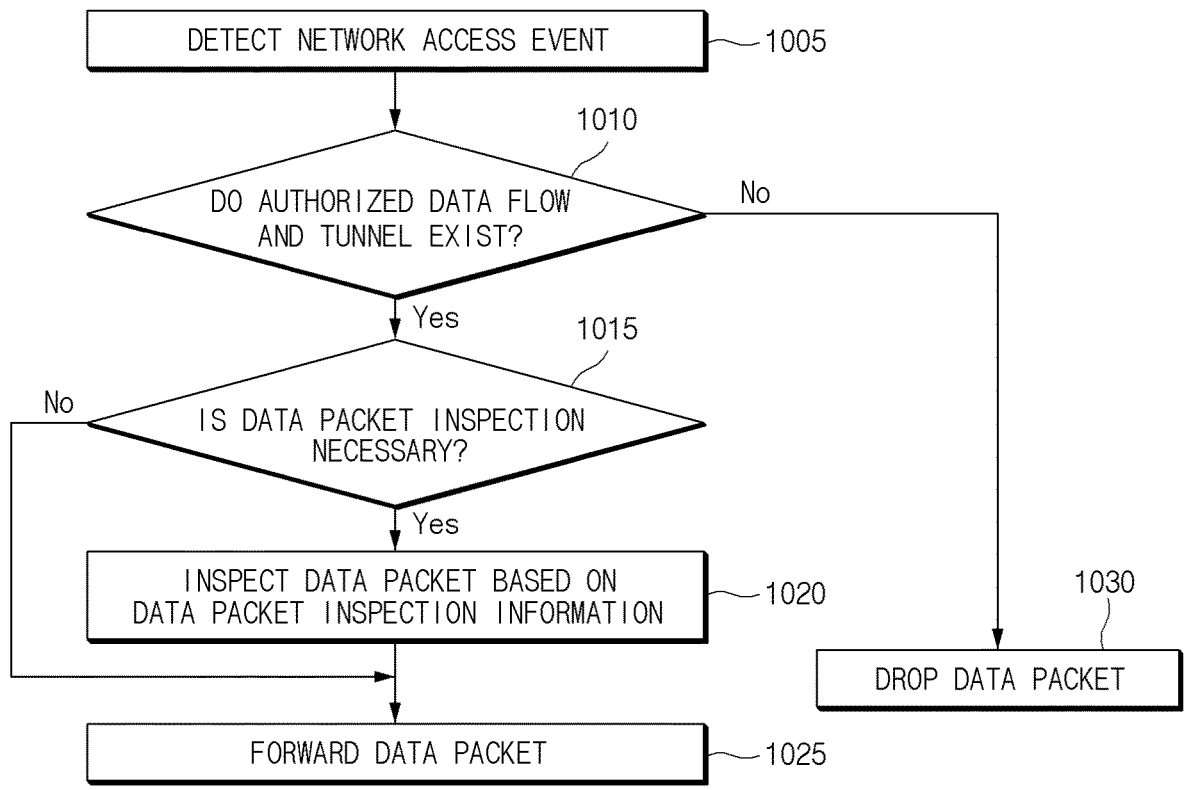
FIGS. 10 and 11 are flowcharts for controlling a network access according to various embodiments.
Figure 11:
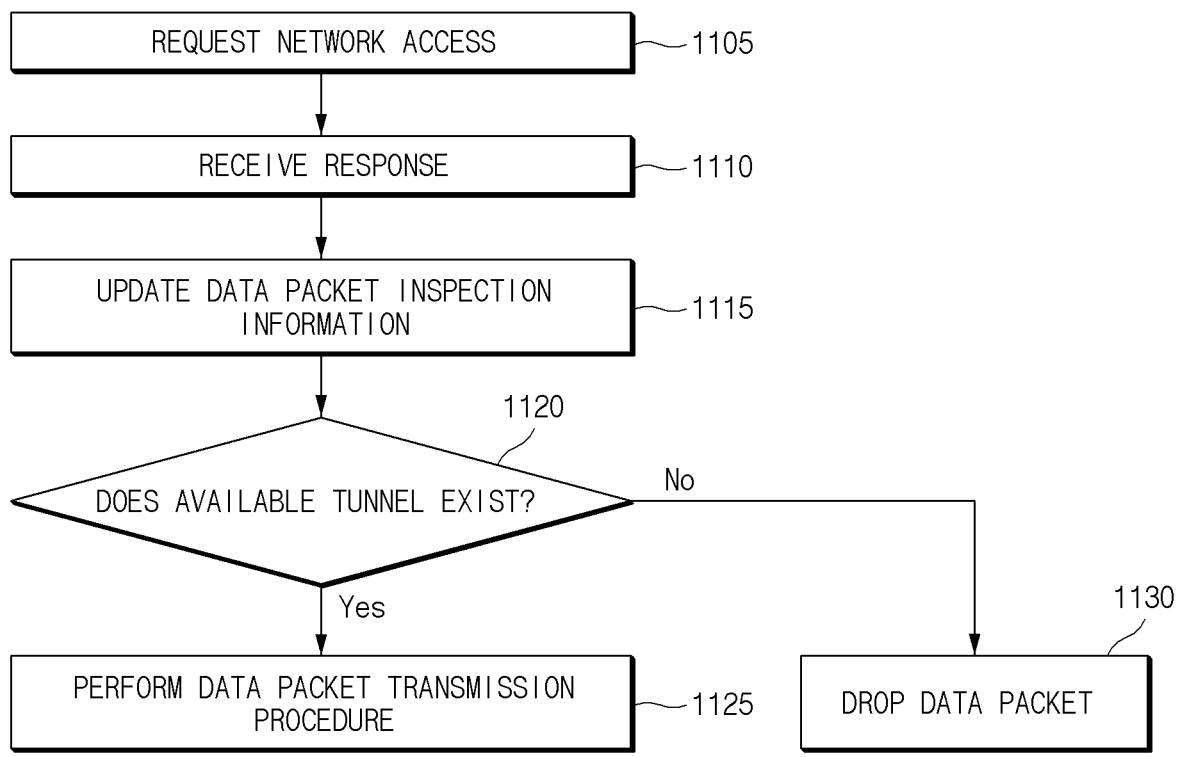

FIGS. 10 and 11 illustrate operation flowcharts for controlling a network access at a source node according to various embodiments. The operations described below may be performed through the source node 201 of FIG. 2. For example, the source node 201 may perform the operations of FIGS. 10 and 11 by executing instructions stored in the memory through a processor. Instructions stored in the memory may be software or programs such as the access control application 211 of FIG. 2.

Referring to FIG. 10, in operation 1005, the access control application 211 of the source node 201 may detect a network access event. For example, operation 1005 may be actually the same as operation 905 of FIG. 9.

In operation 1010, the access control application 211 may determine whether an authorized data flow and tunnel exist. For example, the access control application 211 may identify identification information, destination node IP, and service port information of the target application, and may determine whether the data flow corresponding to the identified information and authorized from the controller 202 exists. In addition, the access control application 211 may determine whether authorized tunnel information exists in the authorized data flow. In an embodiment, in operation 1030, the access control application 211 may drop the data packet when the authorized data flow does not exist or when the authorized tunnel information does not exist in the authorized data flow.

When the authorized data flow and tunnel exist, in operation 1015, the access control application 211 may determine whether inspection of the data packet is necessary. For example, the access control application 211 may determine whether inspection of data packets of the target application is necessary based on data packet inspection information included in the authorized data flow. In an embodiment, in operation 1025, the access control application 211 may forward the data packet when inspection of the data packet is not necessary.

When it is confirmed that inspection of the data packet is necessary, in operation 1020, the access control application 211 may inspect the data packet based on the data packet inspection information. For example, the access control application 211 may inspect the data packet of the target application based on the rule database included in the data packet inspection information.

When the data packet inspection result is successful, in operation 1025, the access control application 211 may forward the data packet of the target application.

Referring to FIG. 11, in operation 1105, the access control application 211 of the source node 201 may perform a network access request. For example, the access control application 211 may request network access and may transmit identification information of the target application, IP of the destination node, and service port information. For another example, operation 1105 may be included in operation 1035 of FIG. 10 and may be actually the same as the network access request (operation 910) of FIG. 9.

In operation 1110, the access control application 211 may receive a response to the network access request. For example, the response to a network access request may include generated data flow information and information necessary for tunnel generation. As another example, the response to a network access request may include data packet inspection information.

When the response to the network access request includes data packet inspection information, in operation 1115, the access control application may update the data packet inspection information in the data flow table. For example, the data packet inspection information may be included in received data flow information.

In operation 1120, the access control application 211 may determine whether an available tunnel exists. For example, when the access control application 211 receives information necessary for tunnel generation, the access control application 211 may generate a tunnel with the gateway 203 and may add the generated tunnel information to the tunnel table. For another example, when tunnel generation is not necessary, the access control application 211 may not generate a tunnel. The access control application 211 may determine whether a tunnel corresponding to the received identification information exists in the tunnel table. In an embodiment, the access control application 211 may drop the data packet of the target application when available tunnel corresponding to the received identification information does not exist. In another embodiment, the access control application 211 may drop the data packet of the target application when the access control application 211 receives information necessary for tunnel generation but fails to generate the tunnel.

In operation 1125, the access control application 211 may perform a data packet transmission procedure when an available tunnel exists. In this case, the data packet transmission procedure will be described in FIG. 13.

Figure 12:
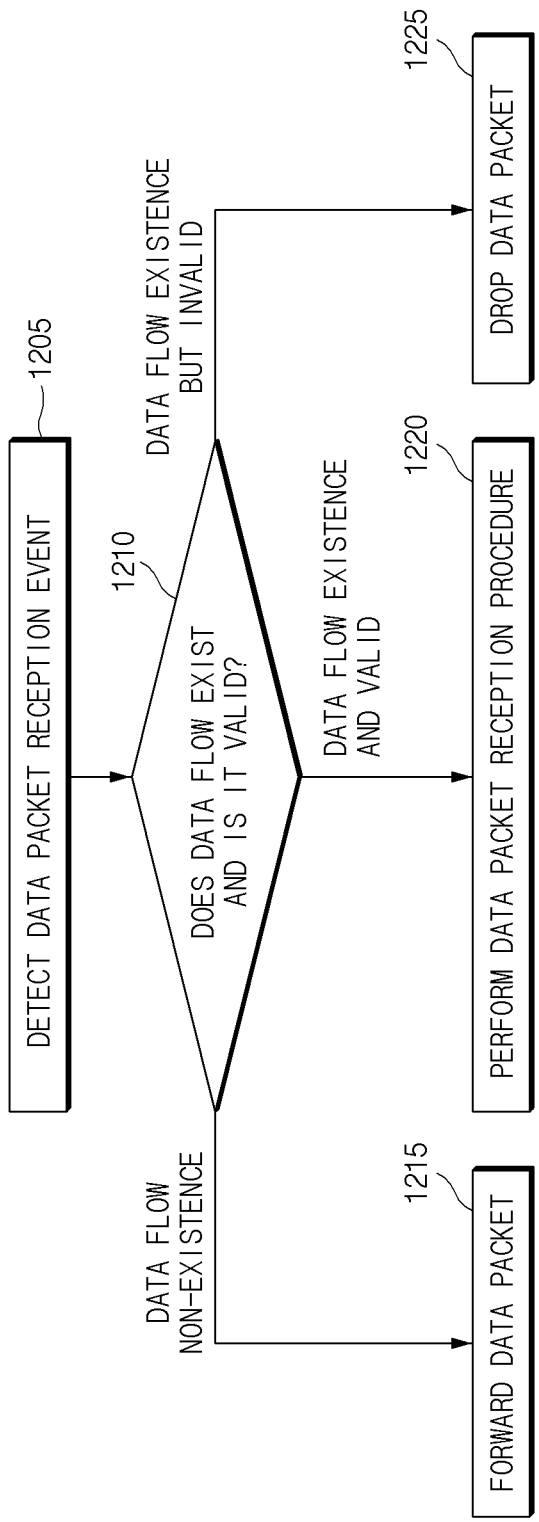
FIG. 12 is a flowchart for controlling reception of a data packet according to various embodiments.

FIG. 12 is a flowchart for controlling reception of a data packet according to various embodiments. The operations described below may be performed through the source node 201 of FIG. 2. For example, the source node 201 may perform operations of FIG. 12 by executing instructions stored in the memory through a processor. Instructions stored in the memory may be software or programs such as the access control application 211 of FIG. 2.

Referring to FIG. 12, in operation 1205, the access control application 211 of the source node 201 may detect a data packet reception event. For example, the access control application 211 may detect that a data packet is received, or may detect that a new data packet is received, in response to a data packet that is transmitted from the source node 201 to the destination network.

In operation 1210, the access control application 211 may determine whether a data flow corresponding to the source IP (Internet Protocol) and service port information of the received data packet exists. For example, the access control application 211 may determine whether data flow information corresponding to the identification information of the received data packet exists in the data flow table included in the memory of the source node 201 and may identify its validity.

In operation 1215, the access control application 211 may forward the received data packet when data flow does not exist. For example, when the data flow information does not exist, since the received data packet is not a data packet transmitted and received by the access control application 211, the access control application 211 may normally forward the received data packet.

In an embodiment, the access control application 211 may perform a data packet reception procedure when data flow information exists and is valid (operation 1220). In another embodiment, the access control application 211 may drop a received data packet when data flow information exists but is invalid (operation 1225). Meanwhile, operation 1220 will be described in FIG. 13.

Figure 13:
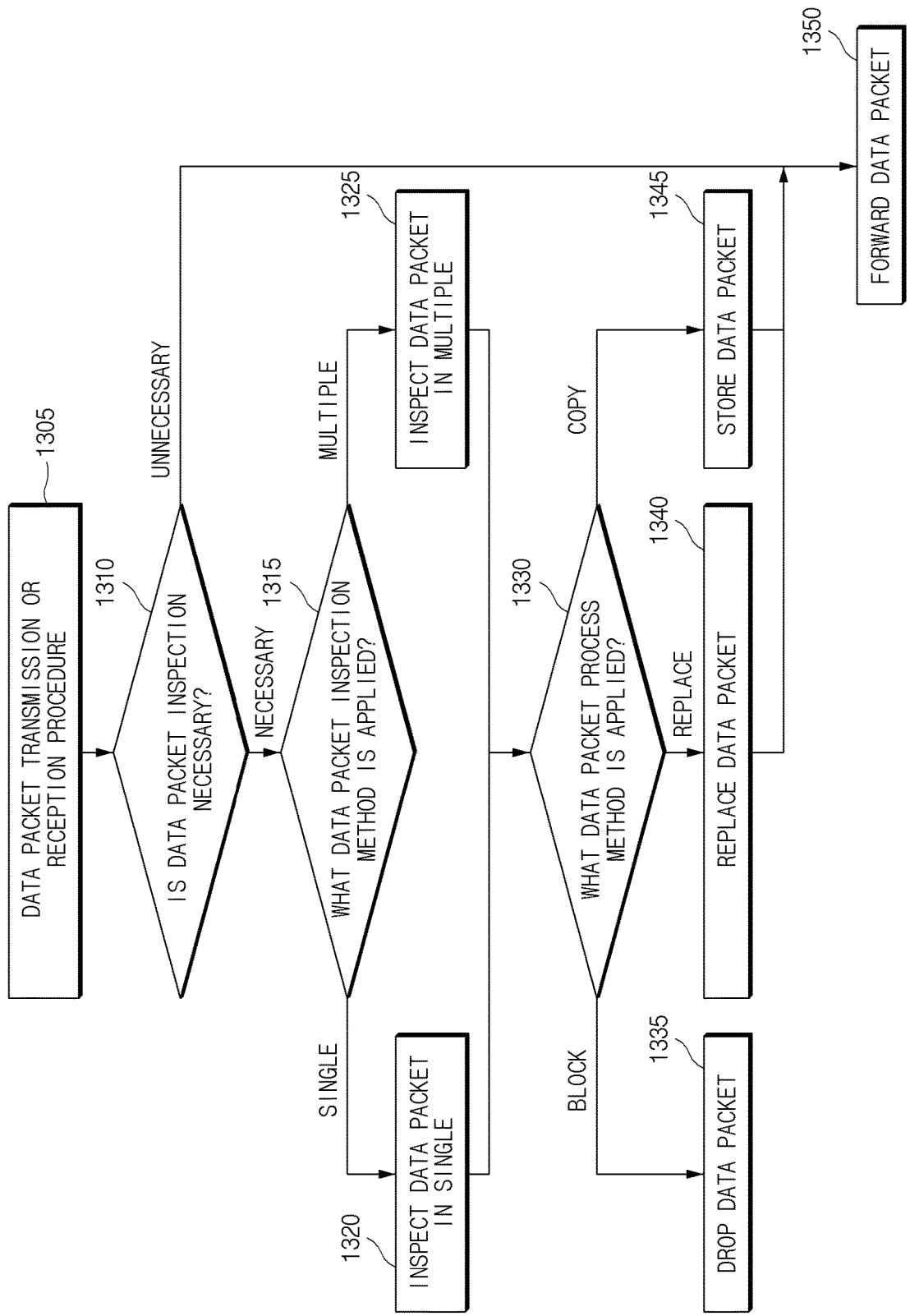
FIG. 13 is a flowchart for inspecting and processing a data packet in a data packet transmission or reception procedure according to various embodiments.

FIG. 13 is a flowchart for inspecting and processing a data packet in a data packet transmission or reception procedure according to various embodiments. Operations described below may be performed through the source node 201 of FIG. 2. For example, the source node 201 may perform operations of FIG. 13 by executing instructions stored in the memory through a processor. Instructions stored in the memory may be software or programs such as the access control application 211 of FIG. 2.

Referring to FIG. 13, in operation 1305, the access control application 211 of the source node 201 may perform a data packet transmission procedure or a data packet reception procedure. For example, the access control application 211 may perform a data packet transmission procedure or a data packet reception procedure. In this case, the data packet transmission procedure may be actually the same as operation 1025 of FIG. 10 and operation 1125 of FIG. 11. In addition, the data packet reception procedure may be actually the same as operation 1220 of FIG. 12.

When a data packet transmission or reception procedures are performed, in operation 1310, the access control application 211 determines whether data packet inspection is necessary. For example, the access control application 211 may identify data packet inspection information from data flow information corresponding to the data packet to be transmitted or received. The access control application 211 may determine whether a data packet to be transmitted or received needs to be inspected based on information indicating whether a data packet inspection is necessary in the identified data packet inspection information. In an embodiment, when it is determined that inspection of the data packet is not necessary, in operation 1350, the access control application 211 may forward the data packet.

When it is determined that inspection of the data packet is necessary, in operation 1315, the access control application 211 may identify the inspection method of the data packet. For example, the access control application 211 may determine whether the data packet inspection method is single packet inspection or multiple packet inspection in the rule database included in the data packet inspection information.

When the data packet inspection method is single packet inspection, in operation 1320, the access control application 211 may perform single data packet inspection. For example, the access control application 211 may inspect data packets in units of data packet transmission for single packet inspection. For example, when the actual data has a size of 1 MB and the transmission unit of the data packet is 1024 Bytes, the access control application 211 may inspect the data packet in units of 1024 Bytes when inspecting a single packet. For another example, the access control application 211 may inspect the data packet based on whether the pattern and inspection location of data included in the data packet of the transmission unit match the pattern and inspection location indicated by the rule database.

When the data packet inspection method is multiple packet inspection, in operation 1325, the access control application 211 may perform multiple data packet inspection. For example, the access control application 211 may store data packets in the memory of the source node 201 up to the end point of data packet transmission and may inspect the data packets for multiple data packet inspection. For example, when the actual data has a size of 1 MB and the transmission unit of the data packet is 1024 Bytes, the access control application 211 may store data of 1 MB, which is the data packet transmission end point, in memory when inspecting multiple packets, and may inspect the stored data. For another example, the access control application 211 may inspect the data packet based on whether the pattern and inspection location of the data included in the data packet stored up to the data packet transmission end point match the pattern and inspection location indicated by the rule database.

In operation 1330, the access control application 211 may determine a method of processing a data packet to be transmitted or received based on the rule database. For example, in operations 1320 and 1325, the access control application 211 may determine a method of processing a data packet based on whether the pattern or location of data included in the data packet to be transmitted or received satisfies the pattern or location indicated by the rule database (operation 1330). In an embodiment, the access control application 211 may determine whether to drop a data packet or replace a data packet. In another embodiment, the access control application 211 may determine whether to drop a data packet or copy a data packet. In another embodiment, the access control application 211 may determine whether to drop a data packet, replace a data packet, or copy a data packet.

When the access control application 211 determines to block the data packet to be transmitted or received, in operation 1335, the access control application 211 may drop the data packet to be transmitted or received.

When the access control application 211 determines to replace the data packet to be transmitted or received, in operation 1340, the access control application 211 may replace the data packet to be transmitted or received through replacement information or rules included in the rule database. In addition, the access control application 211 may forward the replaced data packet (operation 1350).

When the access control application 211 determines to copy the data packet to be transmitted or received, in operation 1345, the access control application 211 may store the data packet to be transmitted or received in the memory or disk of the source node 201. In this case, the access control application 211 may forward the data packet when the data packet is stored (operation 1350).

Figure 14:
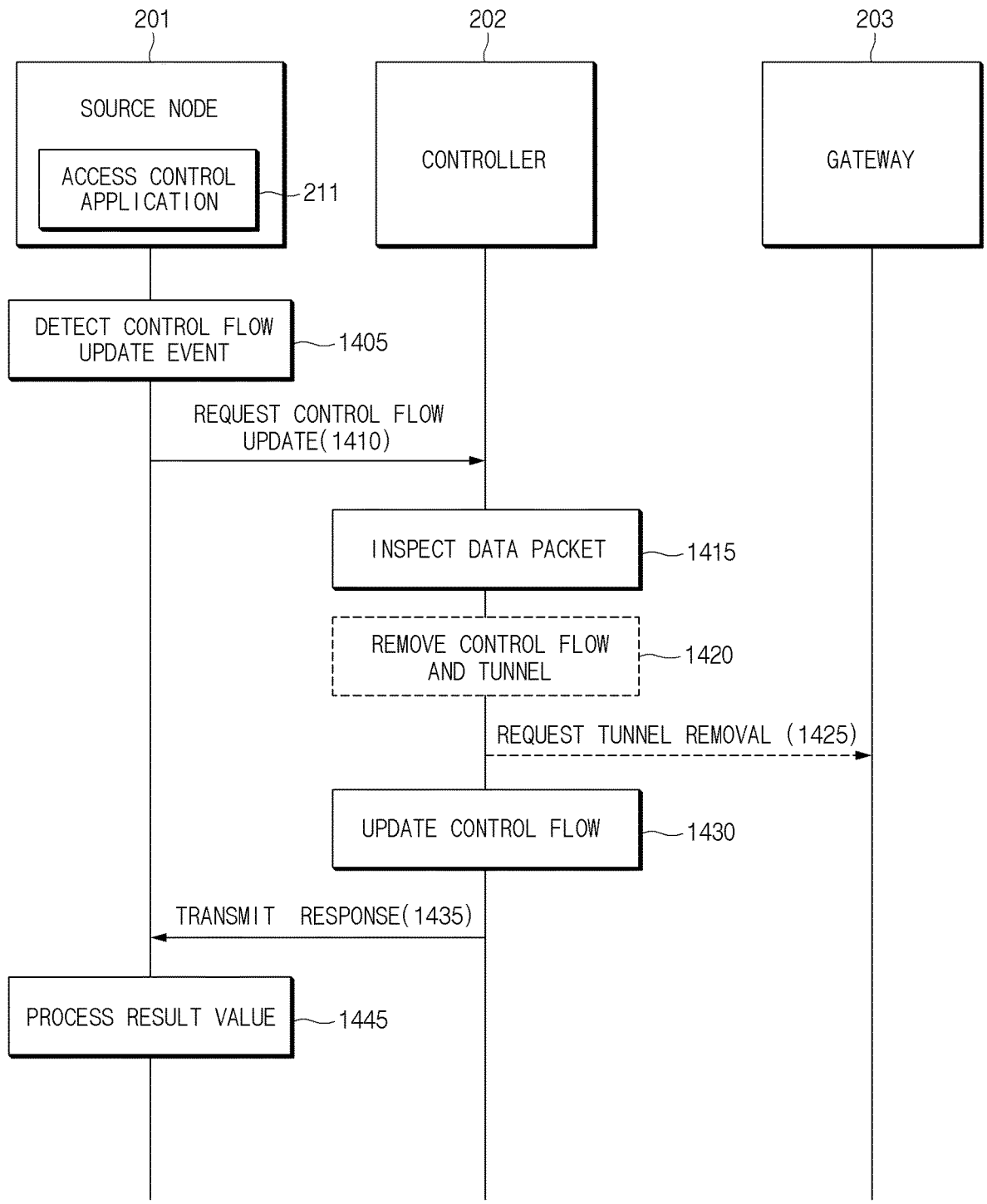
FIG. 14 is a signal flow diagram for updating a control flow according to various embodiments.

FIG. 14 is a signal flow diagram for updating a control flow according to various embodiments.

The source node 201 may receive an updated control flow from the controller 202 by updating the expiration time of the control flow at specified periods. In addition, the source node 201 may transmit data packet information to the controller 202 in specific period units, thereby identifying that the source node 201 is operating normally.

Referring to FIG. 14, in operation 1405, the access control application 211 of the source node 201 may detect a control flow update event. For example, the access control application 211 may detect a control flow update event at specified periods. For another example, the access control application 211 may identify that the terminal is operating normally by transmitting the inspected data packet information or the stored data packet information to the controller 202 in specific period units.

In operation 1410, the access control application 211 may request a control flow update to the controller 202. For example, the access control application 211 may transmit inspected data packet information or stored data packet information to the controller 202 along with control flow identification information.

In operation 1415, the controller 202 may inspect the data packet received from the source node 201. For example, the controller 202 may store the data packet received from the access control application 211 and may determine whether additional inspection is necessary. When the additional inspection is required for the data packet received from the access control application 211, the controller 202 may perform data packet inspection according to data packet inspection information and risk detection policy.

In an embodiment, the controller 202 may determine that the inspection result of the received data packet is a failure. In this case, the controller 202 may remove the control flow and tunnel in operation 1420, and may transmit inaccessible information to the source node 201 in operation 1435. Accordingly, when the data packet inspection fails, the source node 201 may no longer access to the destination network. In an embodiment, the controller 202 may request the gateway 203 to remove the tunnel with respect to the removed tunnel (operation 1425). In this case, the gateway 203 may remove the identified tunnel based on the identification information included in the tunnel removal request. In another embodiment, the controller 202 may not perform operations 1420 and 1425 when the data packet inspection is successful.

When the data packet inspection result is normal, in operation 1430, the controller 202 may update the identified control flow based on the received control flow identification information. For example, the controller 202 may update the expiration time of the control flow.

In operation 1435, the controller 202 may transmit a response to the control flow update request to the source node 201. For example, the controller 202 may transmit updated control flow identification information to the access control application 211.

In operation 1440, the access control application 211 may process the result value according to the received response. For example, the access control application 211 may receive updated control flow identification information and may update the control flow identification information. For another example, when the access control application 211 receives access inaccessibility information, the access control application 211 may be terminated.

Figure 15:
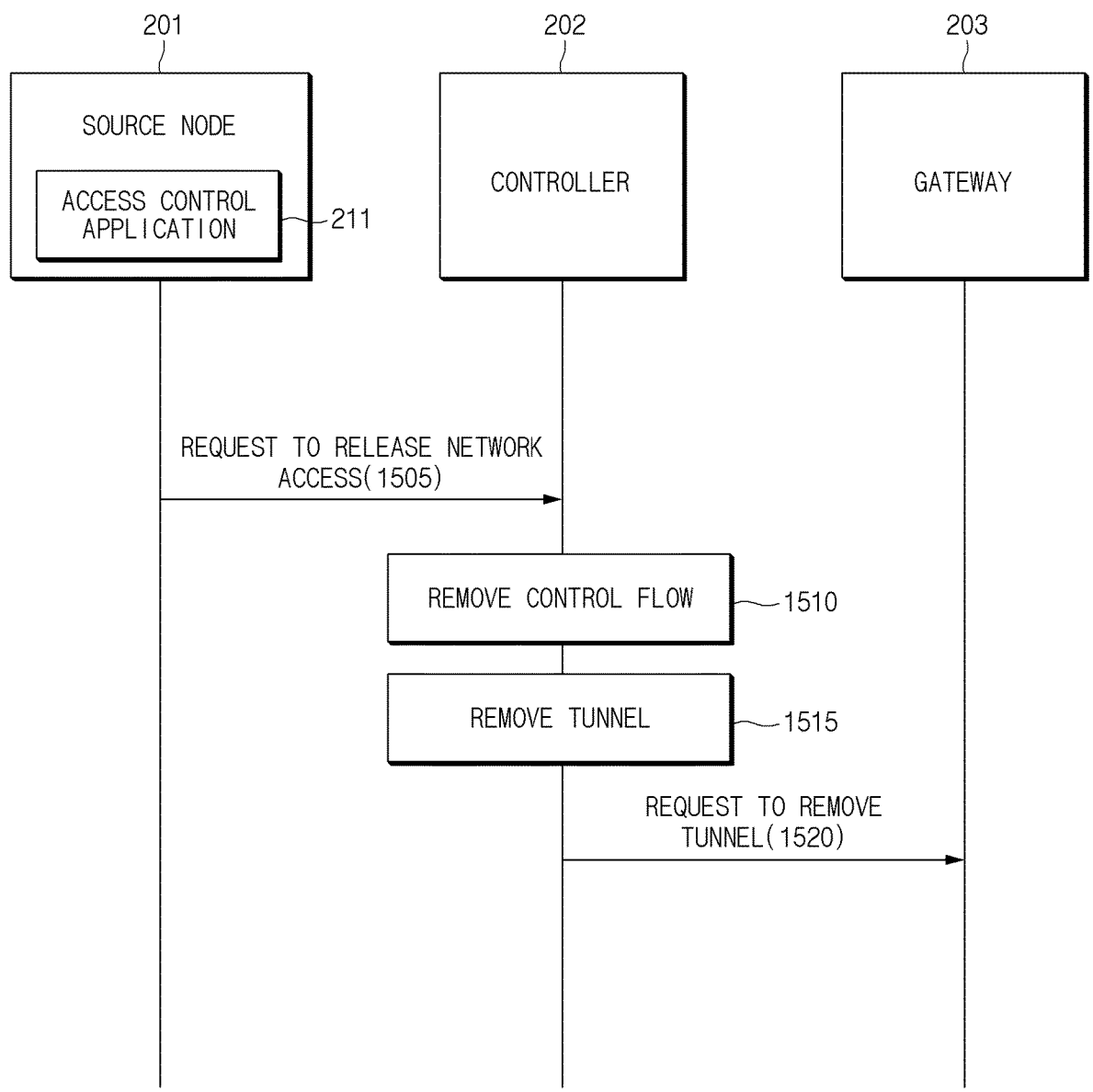
FIG. 15 illustrates a signal flow diagram for releasing a network access according to various embodiments.
Figure 16:
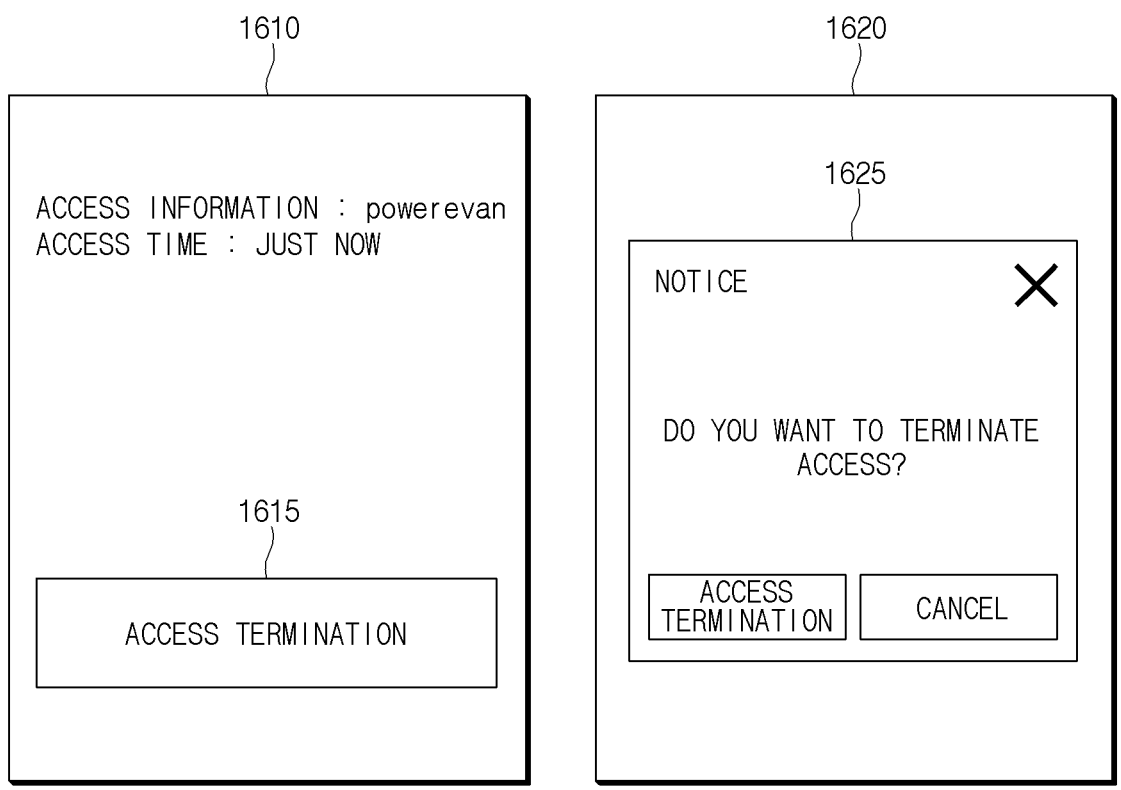
FIG. 16 illustrates a user interface screen for releasing a network access according to various embodiments.

FIG. 15 illustrates a signal flow diagram for releasing a network access according to various embodiments. FIG. 16 illustrates a user interface screen for releasing a network access according to various embodiments.

Referring to FIG. 15, in operation 1505, the source node 201 may request the controller 202 to release a network access. For example, the source node 201 may transmit identification information of the control flow between the source node 201 and the controller 202 to the controller 202 along with information requesting a network access release.

According to an embodiment, the source node 201 may attempt to release the network access in response to the network access release event, such as a user request, a restart of the source node 201, or a request from the access control application 211. For example, referring to FIG. 16, the source node 201 may receive a user input for selecting an access termination button 1615 on a user interface screen 1610 output through the display. The source node 201 may identify an access termination to the user again by outputting a user interface screen 1620 including a pop-up window 1625. For another example, the source node 201 may immediately perform operation 1505 without outputting the user interface screen 1620.

In operation 1510, the controller 202 may remove (or release) the control flow corresponding to the received identification information in response to a request from the source node 201.

In operation 1515, the controller 202 may remove (or release or update) a tunnel dependent on the removed control flow. For example, there may be multiple tunnels dependent on the removed control flow. In this case, the controller 202 may remove (or release) all tunnels dependent on the removed control flow.

In operation 1520, the controller 202 may request the gateway 203 to remove the tunnel dependent on the removed control flow. In this case, the gateway 203 may remove the tunnel in response to the request from the controller 202.

Through the above-described operations, a system including the destination node 204 may provide complete blocking and isolation in which data packets transmitted from the source node 201 may no longer be received.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The invention claimed is:

1. A node comprising:
   a communication circuit;
   a processor operatively connected to the communication circuit; and
   a memory operatively connected to the processor and configured to store a target application and an access control application, and
   wherein the memory stores instructions that, when executed by the processor, cause the node to:
   detect an event of a network access with respect to a destination network of the target application through the access control application;
   determine whether a data flow and a tunnel, which correspond to identification information of the target application and the destination network and are authorized from an external server exist, through the access control application;
   determine whether an inspection of a data packet of the target application is necessary based on data packet inspection information included in the authorized data flow when the authorized data flow and the authorized tunnel exist;
   inspect the data packet based on a rule database included in the data packet inspection information when the inspection of the data packet is necessary; and
   forward the data packet based on the authorized data flow and the authorized tunnel when the inspection of the data packet is not necessary or when a result of the inspection of the data packet is successful.

2. The node of claim 1, wherein the instructions cause the node to:
when the access control application inspects the data packet,
determine whether an inspection method of the data packet included in the rule database is a single inspection or a multiple inspection;
inspect the data packet in units of transmission of the data packet when the inspection method is the single inspection; and
inspect the data packet until a transmission end point of the data packet when the inspection method is the multiple inspection.

3. The node of claim 1, wherein the instructions cause the node to:
determine whether to block or replace the data packet, based on the rule database;
drop the data packet when it is determined to block the data packet; and
replace a part detected in the data packet with replacement information included in the rule database and forward the replaced data packet when it is determined to replace the data packet.

4. The node of claim 1, wherein the instructions cause the node to:
determine whether to block or copy the data packet, based on the rule database;
drop the data packet when it is determined to block the data packet; and
store the data packet in the memory and then forward the data packet when it is determined to copy the data packet.

5. The node of claim 1, wherein the instructions cause the node to:
detect an event of a data packet reception through the access control application;
determine whether the authorized data flow corresponding to a source IP (Internet Protocol) of a received data packet and service port information exists;
forward the received data packet when the authorized data flow does not exist;
inspect the received data packet through data packet inspection information included in the authorized data flow when the authorized data flow exists; and
process the data packet based on a result of the data packet inspection.

6. The node of claim 1, wherein the instructions cause the node to:
detect an event of a controller access with respect to the external server through the access control application;
request the controller access to the external server using the communication circuit in response to the detected event of the controller access;
receive a first response with respect to the request of the controller access from the external server;
the first response being including identification information of the generated control flow and the data packet inspection information, and
update the authorized data flow based on the received data packet inspection information.

7. The node of claim 6, wherein the instructions cause the node to:
receive a first user input requesting a user authentication; and
request a user authentication with respect to a user of the node to the external server using the communication circuit, and the request of the user authentication being including information corresponding to the first user input;
receive a second response with respect to the user authentication request from the external server;
the second response being including the data packet inspection information; and
update the authorized data flow based on the received data packet inspection information.

8. The node of claim 1, wherein the instructions cause the node to:
drop the data packet when the authorized data flow does not exist, or
request a network access with respect to the destination network to the external server using the communication circuit;
the request of the network access with respect to the destination network being including control flow identification information, identification information of the target application, and identification information of the destination network,
receive a third response with respect to the network access request, the third response being including the data packet inspection information, the tunnel generation information, and generated data flow information;
determine whether an available tunnel and data flow exist, based on the third response, and when the available tunnel and data flow exist, perform a data packet inspection based on the data packet inspection information; and
process the data packet based on a result of the data packet inspection.

9. The node of claim 1, wherein the instructions cause the node to:
detect an event of a control flow update through the access control application; and
request the control flow update to the external server, and receive a fourth response with respect to the request of the control flow update, the fourth response being including updated control flow information.

10. The node of claim 1, wherein the instructions cause the node to:
receive a second user input requesting a release of the network access; and
request the external server to release the network access in response to the second user input.

11. A server comprising:
a communication circuit;
a memory storing a database; and
a processor operatively connected to the communication circuitry and the memory, and
wherein the processor is configured to:
receive, from an access control application of a node, a first request requesting a network access with respect to a destination network of a target application stored in the node, the first request being including identification information of a control flow, identification information of the target application, and identification information of the destination network;
determine whether the target application and the destination network are accessible based on the identification information of the control flow and the database;
generate a data flow including data packet inspection information when the target application and the destination network are accessible;

the data packet inspection information being indicating whether an inspection is necessary and including a rule database,
generate information necessary for generating a tunnel between the target application and a gateway of the destination network based on the identification information of the target application and the identification information of the destination network; and
transmit the generated data flow and the information necessary for generating the tunnel to the node, and transfer the information necessary for generating the tunnel to the gateway.

12. The server of claim 11, wherein the processor is configured to:
receive a second request requesting a controller access with respect to the server from the access control application, the second request being including identification information of at least one of the node, the access control application, or a network to which the node belongs;
determine whether the node is an accessible device based on the identification information included in the second request and the database;
generate the control flow when the node is the accessible device;
identify the data packet inspection information in the database corresponding to the identification information; and
transmit the generated control flow identification information and the data packet inspection information to the node using the communication circuit.

13. The server of claim 12, wherein the processor is configured to:
receive a third request requesting a user authentication with respect to a user of the node from the access control application through the control flow, the third request being including user identification information related to the user authentication;
authenticate the user of the node based on information included in the third request and the database;
add the user identification information to the control flow when the user of the node is authenticated;
identify the data packet inspection information in the database corresponding to information included in the third request; and
transmit the control flow to which the user identification information is added and the data packet inspection information to the node.

14. The server of claim 11, wherein the processor is configured to:
receive a fourth request requesting update of the control flow from the node, the fourth request being including identification information of the control flow and data packet information;
inspect the data packet based on the data packet information and the data packet inspection information;
update the control flow and transmit the updated control flow identification information to the node when the data packet inspection is successful;
remove the control flow and remove a tunnel dependent on the control flow when the data packet inspection fails.

15. The server of claim 14, wherein the data packet information includes at least one of data packet information inspected at the node or data packet information stored in the node.

16. The server of claim 11, wherein the processor is configured to:
receive, from the access control application, a fifth request requesting a release of the network access, the fifth request being including the control flow identification information;
remove the control flow corresponding to the identification information included in the fifth request in response to the fifth request; and
remove a tunnel dependent on the removed control flow and transfer information about the removed tunnel to the gateway.

17. A method of operating a network access control system, the method comprising:
detecting, by an access control application, a transmission event of a data packet, at a node;
determining, at the node, whether the data packet needs to be inspected based on data flow information;
inspecting, at the node, the data packet based on data packet inspection information included in the data flow information when the inspection of the data packet is necessary; and
processing, at the node, the data packet based on a result of the inspection of the data packet.

18. The method of claim 17, further comprising:
detecting, by the access control application, a reception event of the data packet, at the node;
determining, at the node, whether the data flow corresponding to identification information included in the received data packet exists;
forwarding, at the node, the received data packet when the data flow does not exist;
dropping, at the node, the received data packet when the data flow exists but is not valid; and
determining, at the node, whether the received data packet needs to be inspected based on the data flow when the data flow exists.

19. The method of claim 17, further comprising:
detecting, at the node, a network access event with respect to a destination network of a target application included in the node through the access control application, and determining whether a data flow and tunnel, which correspond to identification information of the target application and the destination network through the access control application, and authorized from a server exist;
identifying, at the node, data packet inspection information included in the authorized data flow when the authorized data flow and the authorized tunnel exist;
the data packet inspection information being indicating whether the inspection is necessary and including a rule database, and inspecting, at the node, the data packet based on the rule database when the data packet inspection is necessary; and
forwarding, at the node, the data packet based on the authorized data flow and the authorized tunnel when the data packet inspection is not necessary or when a result of the data packet inspection is successful.

20. The method of claim 19, further comprising:
requesting, at the node, a network access with respect to the destination network to the server when the authorized data flow does not exist;
determining, at the server, whether the target application and the destination network are accessible based on information included in the network access request and a database included in the server;

generating, at the server, a data flow including the data packet inspection information when the target application and the destination network are accessible;

generating, at the server, information necessary for generating a tunnel between the target application and a gateway of the destination network, based on the identification information of the target application and the identification information of the destination network;

transferring, at the server, the generated data flow and the information necessary for generating the tunnel to the node, and transferring the information necessary for generating the tunnel to the gateway;

determining, at the node, whether an available tunnel and data flow exist based on information received from the server; and performing, at the node, the data packet inspection when the available tunnel and the data flow exist.

* * * * *